US012684465B2

(12) United States Patent
Gundavelli et al.

(10) Patent No.: US 12,684,465 B2
(45) Date of Patent: Jul. 14, 2026

(54) INTERNET PROTOCOL (IP) PRIVACY INDICATION AND ACTIVATION IN ACCESS NETWORKS

(71) Applicant: Cisco Technology, Inc., San Jose, CA (US)

(72) Inventors: Srinath Gundavelli, San Jose, CA (US); Pradeep Kumar Kathail, Los Altos, CA (US); Eric Voit, Bethesda, MD (US); David A. Maluf, Mountain View, CA (US); Ali Sajassi, Alamo, CA (US)

( * ) Notice: Subject to any disclaimer, the term of this patent is extended or adjusted under 35 U.S.C. 154(b) by 418 days.

(21) Appl. No.: 18/223,255

(22) Filed: Jul. 18, 2023

(65) Prior Publication Data

US 2025/0031133 A1 Jan. 23, 2025

(51) Int. Cl.
*H04W 48/12* (2009.01)
*H04W 12/02* (2009.01)
*H04W 12/08* (2021.01)
*H04W 84/12* (2009.01)

(52) U.S. Cl.
CPC ........... *H04W 48/12* (2013.01); *H04W 12/02* (2013.01); *H04W 12/08* (2013.01); *H04W 84/12* (2013.01)

(58) Field of Classification Search
CPC ..... H04W 48/12; H04W 12/02; H04W 12/08; H04W 84/12
See application file for complete search history.

(56) References Cited

U.S. PATENT DOCUMENTS

| | | | |
|---|---|---|---|
| 2014/0010222 A1 | 1/2014 | Chen et al. | |
| 2016/0249287 A1 | 8/2016 | Xie et al. | |
| 2017/0230905 A1 | 8/2017 | Pularikkal et al. | |
| 2017/0374034 A1* | 12/2017 | Zuniga | H04L 63/0407 |
| 2021/0120405 A1* | 4/2021 | Kim | H04L 27/2656 |
| 2022/0022042 A1* | 1/2022 | Sun | H04L 63/20 |
| 2022/0053414 A1 | 2/2022 | McCann et al. | |
| 2022/0294787 A1* | 9/2022 | Montemurro | H04L 63/20 |
| 2023/0376335 A1* | 11/2023 | Chen | G06F 9/4418 |

* cited by examiner

*Primary Examiner* — Wayne H Cai
(74) *Attorney, Agent, or Firm* — Lee & Hayes, P.C.

(57) ABSTRACT

Techniques for establishing connections between user devices and access points to connect to networks. Access points may indicate privacy-support capabilities, enabling a user device to discover privacy-capable access networks, and use this capability for network selection. Furthermore, the techniques enable the user device to request to enable and/or disable privacy support on an on-demand basis. The techniques described herein include the use of an access point that indicates the network's privacy capability to an endpoint device (e.g., source device, user device, etc.) over one or more link-layer messages, IP address configuration mechanisms, and over authentication protocols.

20 Claims, 16 Drawing Sheets

FIG. 1D

PROCESSOR(S) 220

NETWORK INTERFACE(S) 222

POWER SUPPLIE(S) 224

INPUT/OUTPUT(S) 226

MEMORY 228

APPLICATION(S) 230

BROADCASTING COMPONENT 232

OPERATING SYSTEM 234

COMMUNICATION COMPONENT 236

IP ADDRESS PRIVACY COMPONENT 238

ACCESS POINT 112

Figure 3A:
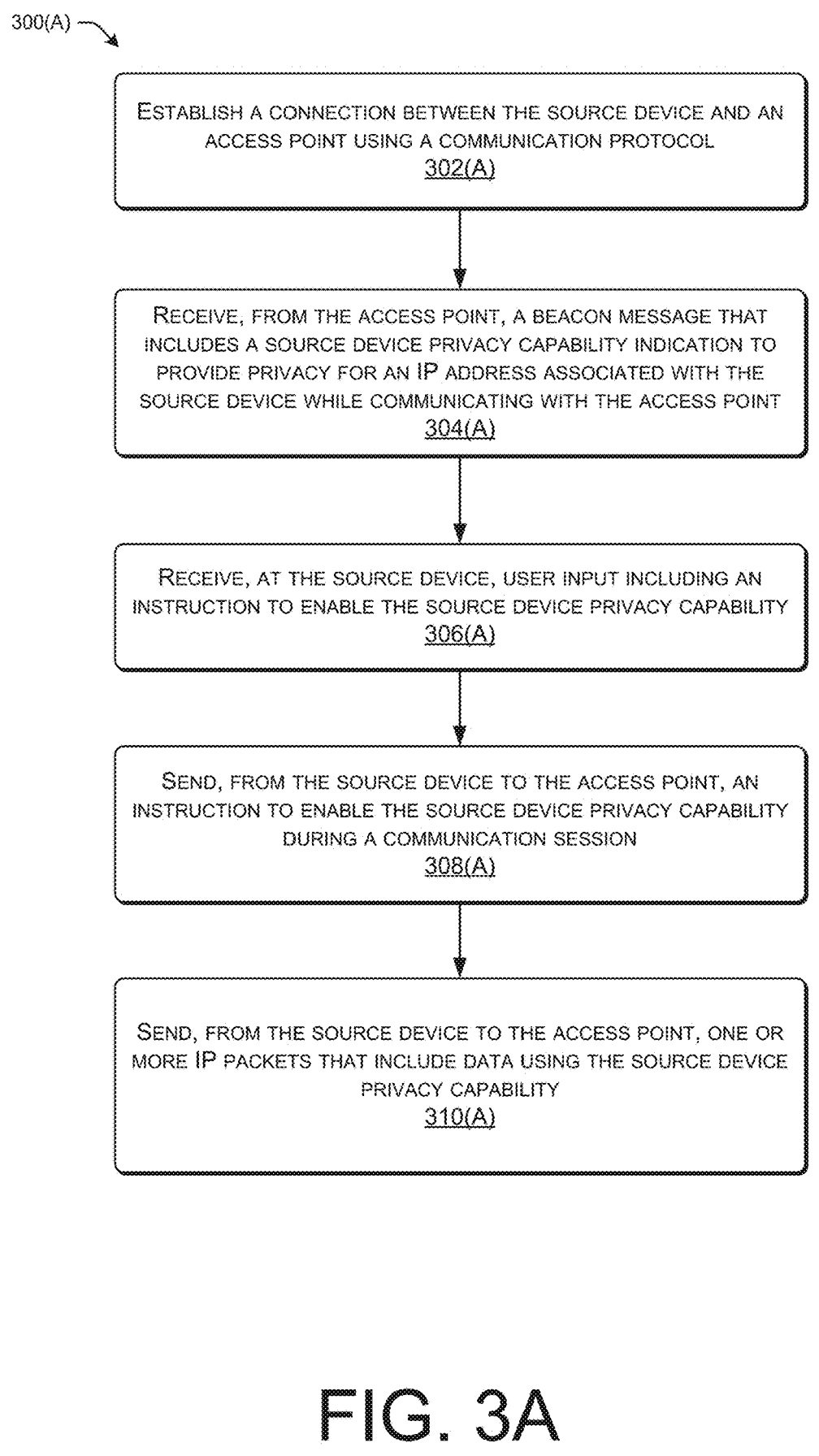

300(A)

```
┌─────────────────────────────────────────────────────┐
│  ESTABLISH A CONNECTION BETWEEN THE SOURCE DEVICE     │
│  AND AN ACCESS POINT USING A COMMUNICATION PROTOCOL   │
│                      302(A)                           │
└─────────────────────────────────────────────────────┘
```

```
┌─────────────────────────────────────────────────────┐
│  RECEIVE, FROM THE ACCESS POINT, A BEACON MESSAGE     │
│  THAT INCLUDES A SOURCE DEVICE PRIVACY CAPABILITY     │
│  INDICATION TO PROVIDE PRIVACY FOR AN IP ADDRESS      │
│  ASSOCIATED WITH THE SOURCE DEVICE WHILE              │
│  COMMUNICATING WITH THE ACCESS POINT                  │
│                      304(A)                           │
└─────────────────────────────────────────────────────┘
```

```
┌─────────────────────────────────────────────────────┐
│  RECEIVE, AT THE SOURCE DEVICE, USER INPUT INCLUDING  │
│  AN INSTRUCTION TO ENABLE THE SOURCE DEVICE PRIVACY   │
│  CAPABILITY                                           │
│                      306(A)                           │
└─────────────────────────────────────────────────────┘
```

```
┌─────────────────────────────────────────────────────┐
│  SEND, FROM THE SOURCE DEVICE TO THE ACCESS POINT,    │
│  AN INSTRUCTION TO ENABLE THE SOURCE DEVICE PRIVACY   │
│  CAPABILITY DURING A COMMUNICATION SESSION            │
│                      308(A)                           │
└─────────────────────────────────────────────────────┘
```

```
┌─────────────────────────────────────────────────────┐
│  SEND, FROM THE SOURCE DEVICE TO THE ACCESS POINT,    │
│  ONE OR MORE IP PACKETS THAT INCLUDE DATA USING THE   │
│  SOURCE DEVICE PRIVACY CAPABILITY                     │
│                      310(A)                           │
└─────────────────────────────────────────────────────┘
```

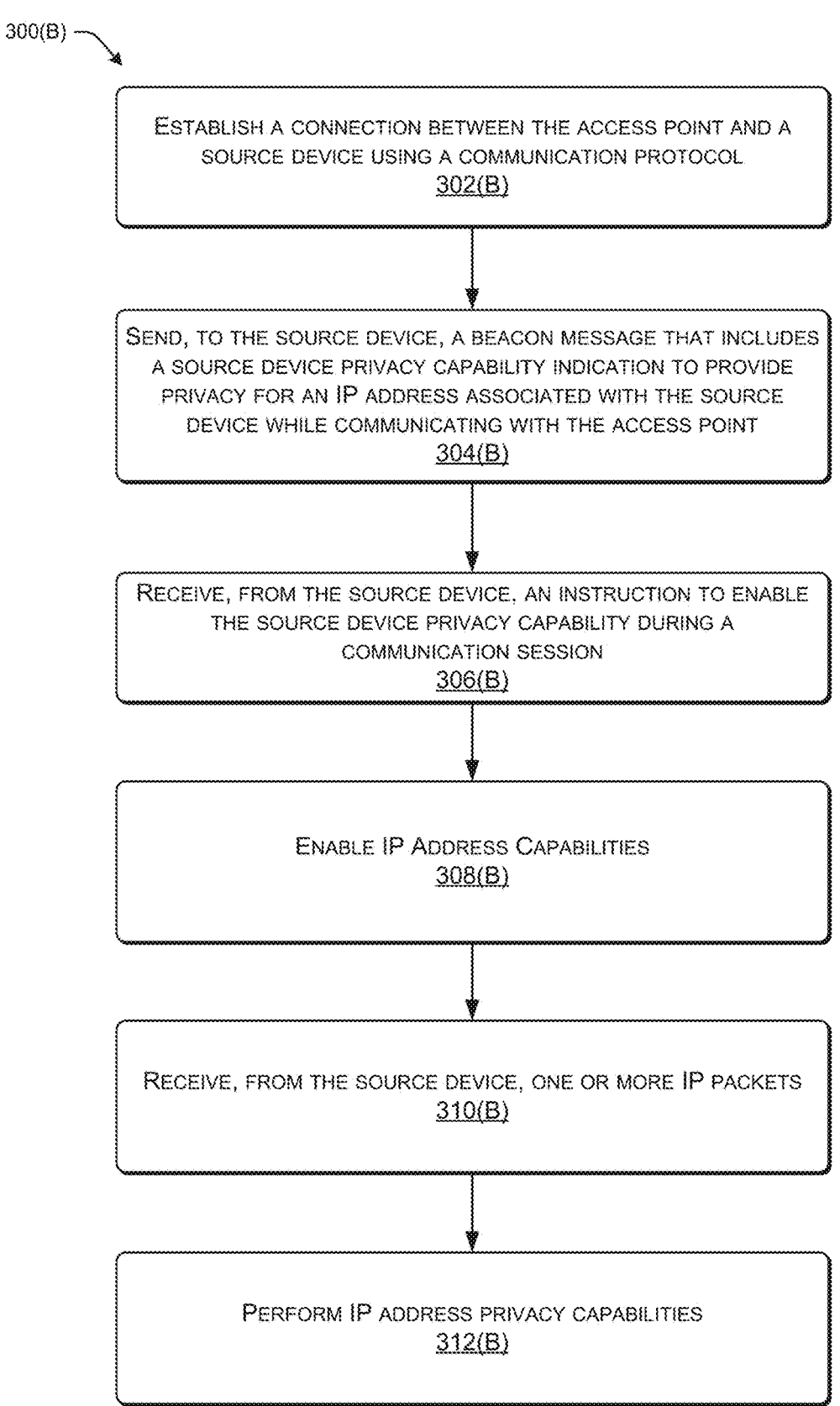

ESTABLISH A CONNECTION BETWEEN THE ACCESS POINT AND A SOURCE DEVICE USING A COMMUNICATION PROTOCOL
302(B)

SEND, TO THE SOURCE DEVICE, A BEACON MESSAGE THAT INCLUDES A SOURCE DEVICE PRIVACY CAPABILITY INDICATION TO PROVIDE PRIVACY FOR AN IP ADDRESS ASSOCIATED WITH THE SOURCE DEVICE WHILE COMMUNICATING WITH THE ACCESS POINT
304(B)

RECEIVE, FROM THE SOURCE DEVICE, AN INSTRUCTION TO ENABLE THE SOURCE DEVICE PRIVACY CAPABILITY DURING A COMMUNICATION SESSION
306(B)

ENABLE IP ADDRESS CAPABILITIES
308(B)

RECEIVE, FROM THE SOURCE DEVICE, ONE OR MORE IP PACKETS
310(B)

PERFORM IP ADDRESS PRIVACY CAPABILITIES
312(B)

FIG. 3B

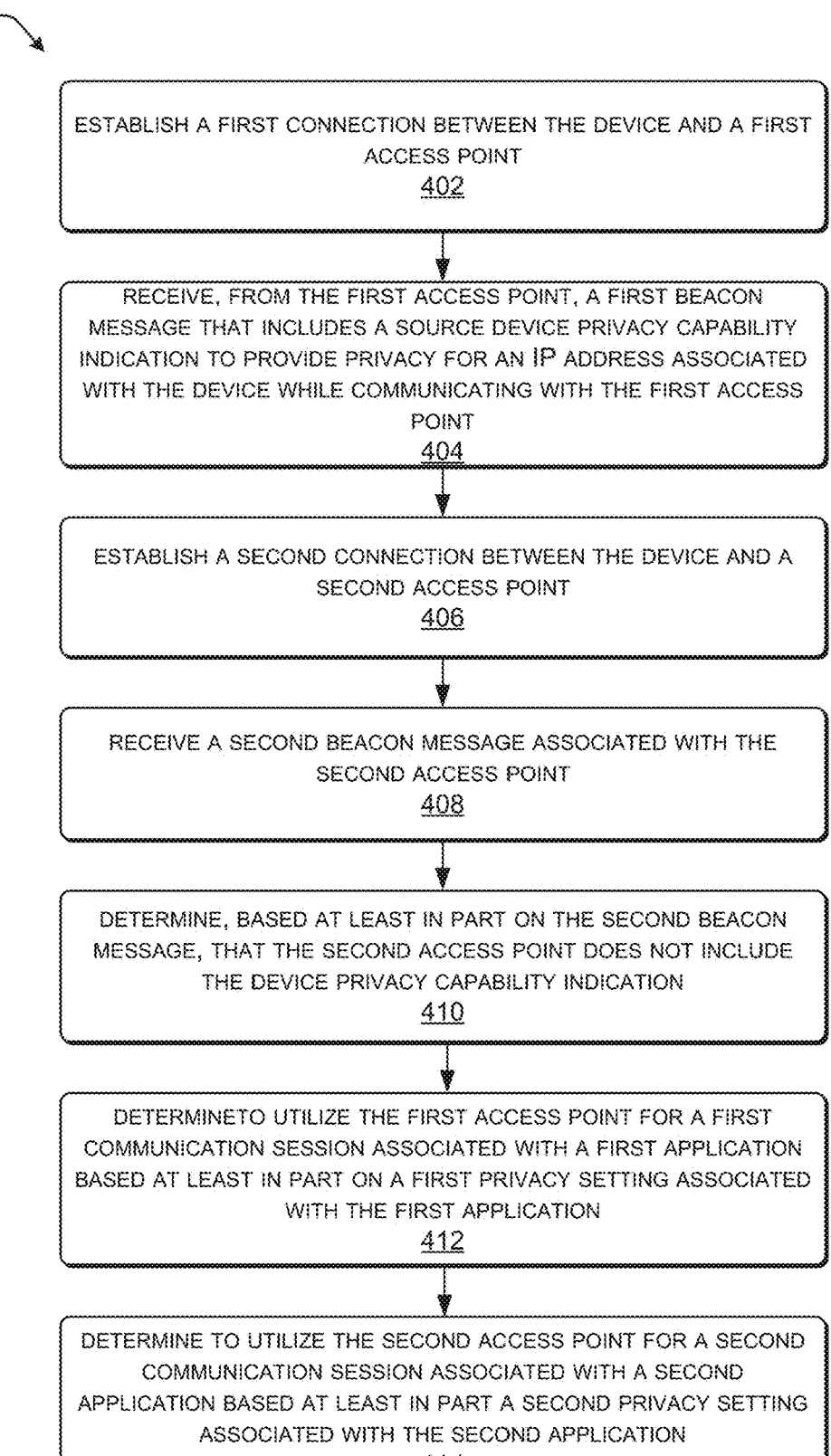

400

ESTABLISH A FIRST CONNECTION BETWEEN THE DEVICE AND A FIRST ACCESS POINT
402

RECEIVE, FROM THE FIRST ACCESS POINT, A FIRST BEACON MESSAGE THAT INCLUDES A SOURCE DEVICE PRIVACY CAPABILITY INDICATION TO PROVIDE PRIVACY FOR AN IP ADDRESS ASSOCIATED WITH THE DEVICE WHILE COMMUNICATING WITH THE FIRST ACCESS POINT
404

ESTABLISH A SECOND CONNECTION BETWEEN THE DEVICE AND A SECOND ACCESS POINT
406

RECEIVE A SECOND BEACON MESSAGE ASSOCIATED WITH THE SECOND ACCESS POINT
408

DETERMINE, BASED AT LEAST IN PART ON THE SECOND BEACON MESSAGE, THAT THE SECOND ACCESS POINT DOES NOT INCLUDE THE DEVICE PRIVACY CAPABILITY INDICATION
410

DETERMINE TO UTILIZE THE FIRST ACCESS POINT FOR A FIRST COMMUNICATION SESSION ASSOCIATED WITH A FIRST APPLICATION BASED AT LEAST IN PART ON A FIRST PRIVACY SETTING ASSOCIATED WITH THE FIRST APPLICATION
412

DETERMINE TO UTILIZE THE SECOND ACCESS POINT FOR A SECOND COMMUNICATION SESSION ASSOCIATED WITH A SECOND APPLICATION BASED AT LEAST IN PART A SECOND PRIVACY SETTING ASSOCIATED WITH THE SECOND APPLICATION
414

FIG. 4

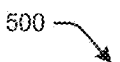

500

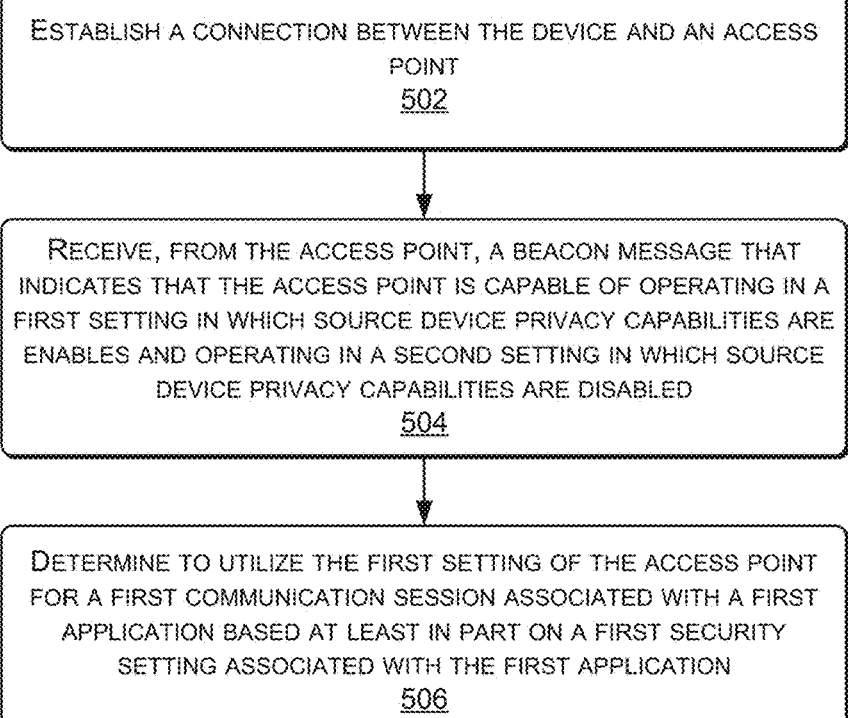

ESTABLISH A CONNECTION BETWEEN THE DEVICE AND AN ACCESS
POINT
502

RECEIVE, FROM THE ACCESS POINT, A BEACON MESSAGE THAT
INDICATES THAT THE ACCESS POINT IS CAPABLE OF OPERATING IN A
FIRST SETTING IN WHICH SOURCE DEVICE PRIVACY CAPABILITIES ARE
ENABLES AND OPERATING IN A SECOND SETTING IN WHICH SOURCE
DEVICE PRIVACY CAPABILITIES ARE DISABLED
504

DETERMINE TO UTILIZE THE FIRST SETTING OF THE ACCESS POINT
FOR A FIRST COMMUNICATION SESSION ASSOCIATED WITH A FIRST
APPLICATION BASED AT LEAST IN PART ON A FIRST SECURITY
SETTING ASSOCIATED WITH THE FIRST APPLICATION
506

DETERMINE TO UTILIZE THE SECOND SETTING OF THE ACCESS POINT
FOR A SECOND COMMUNICATION SESSION ASSOCIATED WITH A
SECOND APPLICATION BASED AT LEAST IN PART A SECOND SECURITY
SETTING ASSOCIATED WITH THE SECOND APPLICATION
508

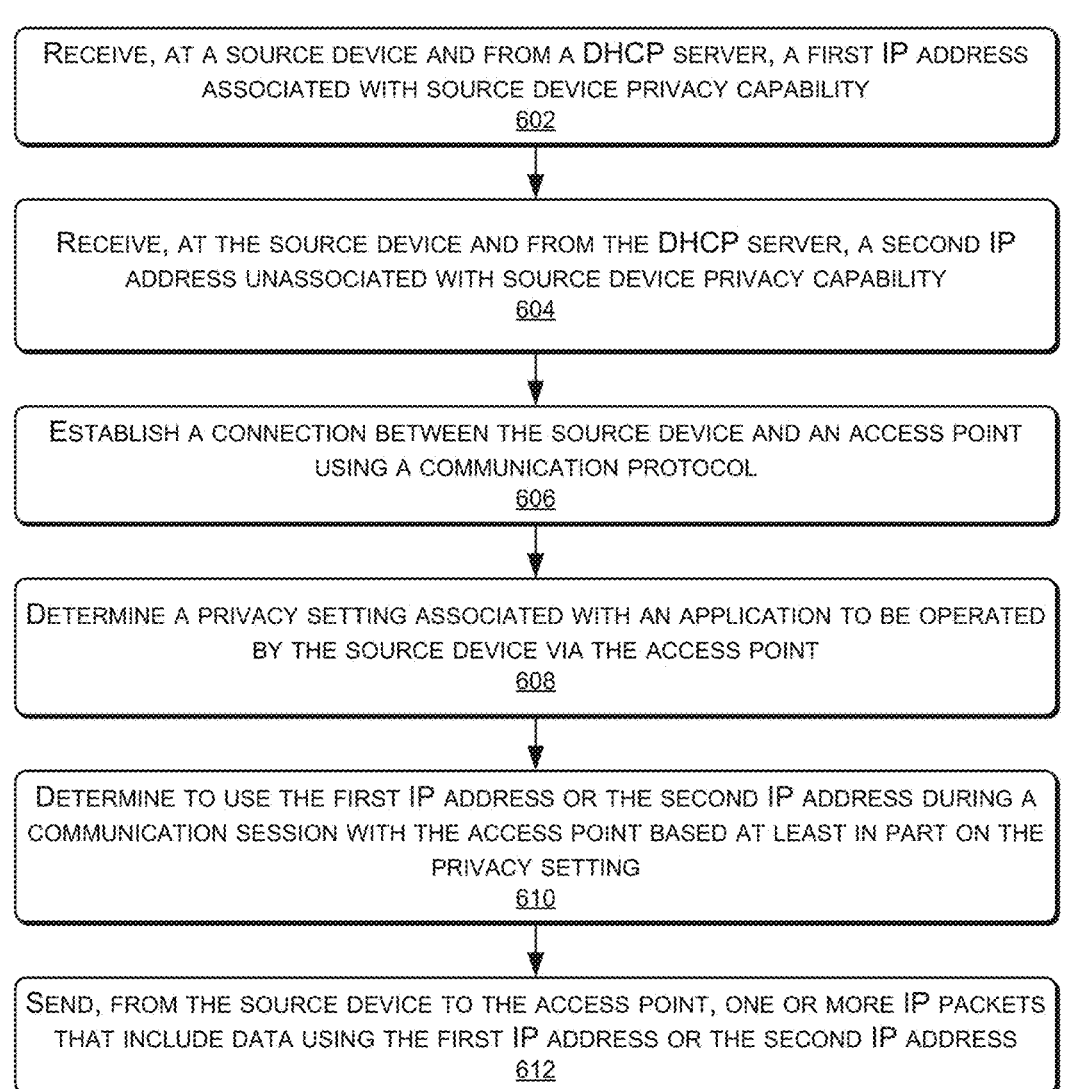

RECEIVE, AT A SOURCE DEVICE AND FROM A DHCP SERVER, A FIRST IP ADDRESS ASSOCIATED WITH SOURCE DEVICE PRIVACY CAPABILITY
602

RECEIVE, AT THE SOURCE DEVICE AND FROM THE DHCP SERVER, A SECOND IP ADDRESS UNASSOCIATED WITH SOURCE DEVICE PRIVACY CAPABILITY
604

ESTABLISH A CONNECTION BETWEEN THE SOURCE DEVICE AND AN ACCESS POINT USING A COMMUNICATION PROTOCOL
606

DETERMINE A PRIVACY SETTING ASSOCIATED WITH AN APPLICATION TO BE OPERATED BY THE SOURCE DEVICE VIA THE ACCESS POINT
608

DETERMINE TO USE THE FIRST IP ADDRESS OR THE SECOND IP ADDRESS DURING A COMMUNICATION SESSION WITH THE ACCESS POINT BASED AT LEAST IN PART ON THE PRIVACY SETTING
610

SEND, FROM THE SOURCE DEVICE TO THE ACCESS POINT, ONE OR MORE IP PACKETS THAT INCLUDE DATA USING THE FIRST IP ADDRESS OR THE SECOND IP ADDRESS
612

FIG. 6

INTERNET PROTOCOL (IP) PRIVACY INDICATION AND ACTIVATION IN ACCESS NETWORKS

BACKGROUND

Internet protocol (IP) addresses used in IP-based packet communications may be considered as a Personally Identifiable Information (PII) element. IP addresses may unambiguously identify a device that can be associated with a person and therefore correlate to a user's identity. IP addresses can also be correlated to a given geo-location, as the associated IP prefix may be hosted on a given local area network (LAN) segment and which typically is in one physical location. These correlations between an IP address and to a user, and/or to a geo-location makes the IP address a privacy-sensitive information element, which can be exploited to profile the user. With increased focus on user privacy, the current state of networks lacks providing adequate IP privacy and protecting user identity to avoid traceability of the user.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1D illustrates another example environment of FIG. 1A in which the user device may present selectable options for operating with IP privacy capabilities enabled and/or disabled.

FIG. 3A illustrates a flow diagram of an example method for determining that IP privacy capabilities are available via a wireless local area network (WLAN).

FIG. 3B illustrates a flow diagram of an example method for providing IP privacy capabilities via a wireless local area network (WLAN).

FIG. 4 illustrates a flow diagram of an example method for a user device to communicate with multiple access points determined by IP privacy capabilities provided by the access points.

FIG. 5 illustrates a flow diagram of an example method for a user device to communicate with an access point using different IP privacy capabilities.

FIG. 6 illustrates a flow diagram of an example method for a user device to receive multiple IP addresses having different IP privacy capabilities from a DHCP server.

DETAILED DESCRIPTION

Figure 1A:
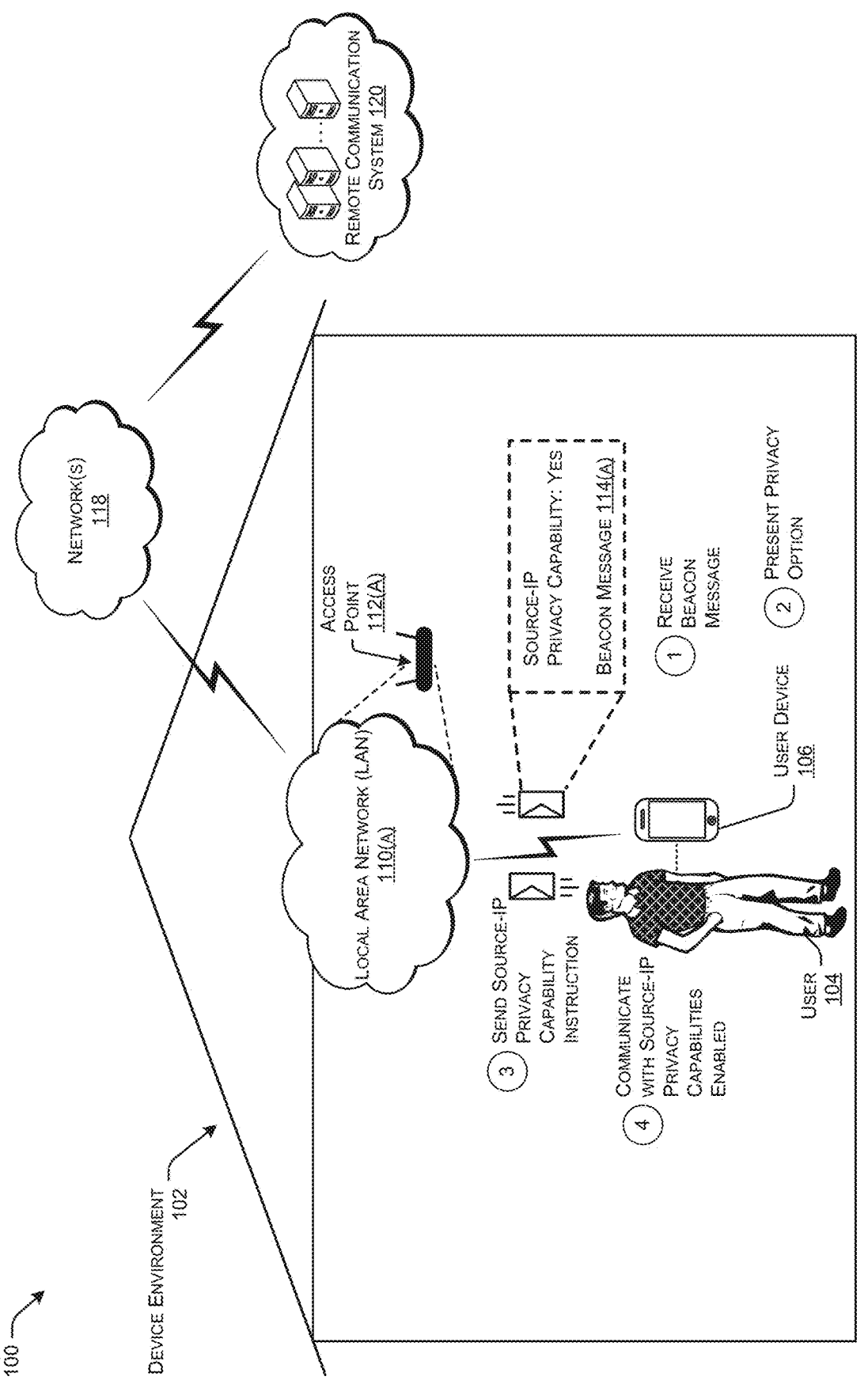
FIG. 1A illustrates an example environment in which a user device detects IP privacy capabilities of a local area network (LAN).

This disclosure describes, at least in part, techniques to enable access networks to indicate privacy-support capabilities, enabling a user device to discover privacy-capable access networks, and using this capability for network selection. Furthermore, the techniques enable the user device to request to enable and/or disable privacy support on an on-demand basis. The techniques described herein include the use of an access point that indicates the network's privacy capability to an endpoint device (e.g., source device, user device, etc.) over one or more link-layer messages, IP address configuration mechanisms, and over authentication protocols. For instance, a user device may establish connection with an access point using a network (e.g., a wireless local area network (WLAN)), and receive an indication, (e.g., a beacon message, an advertisement, etc.) from the access point that includes privacy capability information for providing privacy for an IP address associated with the user device while communicating with the access point. The user device may present a selectable option to a user informing the user that the access point provides privacy for IP addresses and enabling the user to select the access point and/or a network accessible by the access point for the user device to communicate with (e.g., sending one or more IP packets). Once the user device receives user input indicating whether or not the user desires to operate with the IP privacy capabilities enabled, the user device may send an indication to the access point instructing the access point to enable the IP privacy capabilities when the user device is communicates with the access point and/or via the networks accessible by the access point. In this way, the user device may discover networks capable of offering privacy services, and request to enable and/or disable privacy capability on an on-demand basis.

According to the techniques described herein, a user device may be configured to connect to one or more networks, such as a WLAN and ultimately an Internet, and perform actions on behalf of users (e.g., streaming music and videos, purchasing items, controlling other devices and appliances, searching the Internet, and so forth). However, the users may desire their user devices to communicate via the WLAN (such as an IEEE 802.11 WLAN, commonly called "WiFi"), such that the IP address associated with the user device is private. In other instances, a user may desire the IP address to not to be private for particular applications (e.g., ride sharing applications) operating on the user device and/or when accessing certain websites (e.g., shopping websites). According to the techniques described herein, a user device may detect a privacy-support capability with a WLAN, and be configured to enable and/or disable the privacy-support capability, via the link layer (e.g., layer 3).

The user device may be located in an environment and may be configured to, periodically or continuously, listen to detect beacon messages and/or advertisement messages broadcasted from other devices (e.g., access points) using the PAN protocol. Accordingly, one or more user devices located in the environment may detect the beacon messages and/or advertisement messages from an access point within the environment and determine if the beacon message and/or advertisement message includes an indication of device privacy capabilities provides by the access point. The access point may have connectivity to one or more networks. For instance, the access point may be connected to the WLAN, and/or be connected to other networks such as cellular networks including one or more nodes, such as an eNodeB or gNodeB. In some examples, the user device may determine the privacy capabilities of the access point by responding to an Access Network Query Protocol (ANQP) query using a Generic Advertising Service (GAS) request frame. In some examples, when operating in a cellular network (e.g., a 3GPP 4G network and/or a 5G network) the user device may determine the privacy capabilities via 3GPP link-layer messages.

In some examples, once the user device determines the device privacy capabilities of the access point, the user device may present a selectable option for the user of the user device to provide user input that indicates whether or not the user desires to communicate with the privacy capabilities enabled or disabled. In some cases, the selectable option may be presented in response to the user device establishing an initial communication with the access point. In some cases, the selectable option may be presented in response to the user opening an application on the user device and/or accessing a web page via a web browser operating on the user device. For example, there may be instances in which the user desires for a first application to operate with privacy capabilities enabled while a second different application operates with privacy capabilities disabled. For instance, it may be beneficial for a banking application to operate with privacy capabilities enabled while a ride sharing application may require some amount of identifying data (e.g., geolocation) in order to operate properly.

In some examples, once the user device receives user input indicating if the user device is to operate with privacy capabilities enabled and/or which applications and/or web sites are to operate with privacy capabilities enabled, the user device may send an instruction to the access point to enable and/or disable the privacy capabilities during a communication session with the user device and/or with a particular application and/or web site operating on the device. In some cases, the instruction to enable and/or disable the device privacy capabilities during the communication session may include a bit or a flag included in an association request for joining a basic service set (BSS). In some examples, the instruction to enable and/or disable the device privacy capabilities during the communication session may be perform during 802.1x and/or EAP authentication procedures. In some examples, the access point may be an IEEE 802.11 capable Wi-Fi access point and the beacon message may be sent during a target beacon transit time and includes a Service Set Identifier (SSID) associated with the access point.

In some cases, once the user device has sent an instruction to the access point indicating whether the privacy capabilities are to be enabled or disabled, the user device may proceed to communicate (e.g., send IP packets associated with an application and/or a web site) using the desired privacy capabilities.

In some cases, the user device may communicate with multiple access points within an environment and may receive beacon messages and/or advertisement messages from each access point that indicate the privacy capabilities of each respective access point. In some cases, the user device may communicate (e.g., send IP packets) with a particular access point based on which application and/or web site is being operated via the user device and what privacy settings are associated with each application and/or web site. For instance, if the user device determines that a first application is determined to operate with privacy capabilities enabled, the user device may communicate with a first access point that previously indicated that it provides privacy capabilities. Similarly, if the user device determines that a second application is determined to operate with privacy capabilities disabled, the user device may communicate with a second access point that previously indicated that it does not provide privacy capabilities.

In some cases, the user device may receive multiple IP addresses to communicate with from a Dynamic Host Configuration Protocol (DHCP) server that may be used based on if the user device is to operate with privacy capabilities enabled or disabled. For instance the DHCP server may receive a list of IP address ranges from one or more access points that the access points indicate are to be associated with privacy capabilities enabled or privacy capabilities disabled. As the user device participates in IPv4 address configuration using DHCPv4 or DHCPv6, an option may be included for requesting an IP address from an IP address pool that the network may automatically enable IP privacy capabilities. In response, the DHCP server may allocate an IP address from an IP pool that will have IP privacy support. In some examples, a user device may support IPV6 and utilize Stateless Auto-address configuration (SLAAC) support and receive privacy capability indications as an IPV6 prefix. For example, an IPV6 prefix CAFE::1/64 may be tagged as a prefix with privacy capabilities enabled and another IPV6 prefix BABA::1/64 may be tagged as a prefix with privacy capabilities disabled (e.g., no IP privacy support). In some case, the user device may generate IPV6 address for these prefixes and, based on the IP privacy needs will perform the source address selection for the applications and/or web sites operating on the user device. The indication of the privacy properties may define new provisioning domain (PvD) options, defined in RFC 8801, or as extended JSON elements to be quired by the user device using PvD URL. Although some of the techniques described herein are with respect to certain communication protocols, such as WLAN protocols (e.g., 802.11 protocols), PAN protocols (e.g., BLE), other types of communication protocols and/or networks may similarly utilize the techniques described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates an example environment 100 in which a user device receives one or more indications of a network's privacy capability within a local area network (LAN) and sends an indication instructing an access point to enable and/or disable the privacy capabilities.

As illustrated, the example environment 100 may include a device environment 102 that includes a user 104, and a user device 106. The user device 106 may comprise any sort of client computing device capable of communicating using one or more communication protocols and/or over one or more networks, such as voice-controlled assistants, tablet computing devices, smart televisions (TVs), laptop computer, desktop computers, mobile phones, display devices, audio devices, gaming devices, and/or the like.

As illustrated, the device environment may further include an access point 112(A) that provides a local area network (LAN) 110(A). The LAN 110(A) may comprise any type of LAN, including any combination of wired and/or wireless LANs (e.g., WLANS), such as campus area networks (CANs), metropolitan area networks (MANs), etc. In some instances, the LAN 110(A) may comprise a network that follows an IEEE 802.11 standard, or a "WiFi" network.

As illustrated, the user device 106 may, at "1," receive a beacon message 114(A) from the access point 112(A)(e.g., establishing a connection with the access point 112(A)). In some examples, the beacon message 114(A) may comprise a BLE advertisement message, or "beacon," that is transmitted using a radio transmitter and according to the BLE protocol. The user device 106 may receive a single beacon message 114(A), or continuously/periodically receive beacon messages 114(A) from access points, such as access point 112(A) within the device environment using a PAN protocol, such as BLE. The beacon message(s) 114(A) may include various types of data and/or metadata. For instance, the beacon message 114(A) may indicate privacy capabilities of the access point 112(A) and, in some cases, a network (e.g., LAN 110(A), network(s) 118, an Internet, etc.) that the access point 112(A) is in communication with. In some examples, the user device 106 may determine the privacy capabilities of the access point 112(A)(e.g., receive the beacon message 114(A)) by responding to an Access Network Query Protocol (ANQP) query using a Generic Advertising Service (GAS) request frame.

Based on receiving the beacon message 114(A), the user device 106 may, at "2," present a selectable option for the user 104 to provide user input that indicates whether or not the user 104 desires to communicate with the privacy capabilities of the access point 112(A) enabled or disabled. In some cases, the selectable option may be presented in response to the user device 106 establishing an initial communication with the access point 112(A). In some cases, the selectable option may be presented in response to the user 104 opening an application on the user device 106 and/or accessing a web page via a web browser operating on the user device 106. For example, there may be instances in which the user 104 desires for a first application to operate with privacy capabilities enabled while a second different application operates with privacy capabilities disabled. For instance, it may be beneficial for a banking application to operate with privacy capabilities enabled while a ride sharing application may require some amount of identifying data (e.g., geolocation) in order to operate properly.

Based on the input received form the user 104, at "3," the user device 106 may send a privacy capability instruction (e.g., source-IP privacy capabilities) to the access point 112(A). For example, once the user device 106 receives user input indicating if the user device 106 is to operate with privacy capabilities enabled and/or which applications and/or web sites are to operate with privacy capabilities enabled, the user device 106 may send an instruction to the access point 112(A) to enable and/or disable the privacy capabilities during a communication session with the user device 106 and/or with a particular application and/or web site operating on the user device 106. In some cases, the instruction to enable and/or disable the device privacy capabilities during the communication session may include a bit or a flag included in an association request for joining a basic service set (BSS). In some examples, the instruction to enable and/or disable the device privacy capabilities during the communication session may be perform during 802.1x and/or EAP authentication procedures. In some examples, the access point 1112(A) may be an IEEE 802.11 capable Wi-Fi access point and the beacon message may be sent during a target beacon transit time and includes a Service Set Identifier (SSID) associated with the access point 112(A). In this way, the user device 106 may establish the privacy capabilities to be utilized during a communication session with the access point 112(A) during the link layer phase of communication such that the privacy capabilities are enabled (e.g., or disabled) prior to IP data packets associated with a particular application and/or web site are sent via the network 118.

Once the privacy capabilities of the access point 112(A) are enabled and/or disabled, at "4," the user device 106 may proceed to communicate (e.g., send IP packets associated with an application and/or a web site) using the desired privacy capabilities (e.g., source-IP privacy capabilities). For instance, the user device 106 may have connectivity to the LAN 110(A) and transmit data packets via the LAN 110(A) and over one or more networks 118 (e.g., the Internet).

As illustrated, the remote communication system 120 may be hosted by one or more network-accessible resources. While illustrated as being collocated, it is to be appreciated that these resources may be located across different regions and/or across the globe. Further, the network(s) 118 which connects to the remote communication system 120, may represent an array or wired networks, wireless networks, or combinations thereof. Further, each of the system(s) of the resources may generally refer to a network-accessible system—or "cloud-based system"—implemented as a computing infrastructure of processors, storage, software, data access, and so forth that is maintained and accessible via the network(s) 118, such as the Internet. Cloud-based systems may not require end-user knowledge of the physical location and configuration of the system that delivers the services. As illustrated, the remote communication system 120 may comprise the network-accessible resource(s), such as servers and/or other devices. Multiple of such resources may be included in the system(s).

Figure 1B:
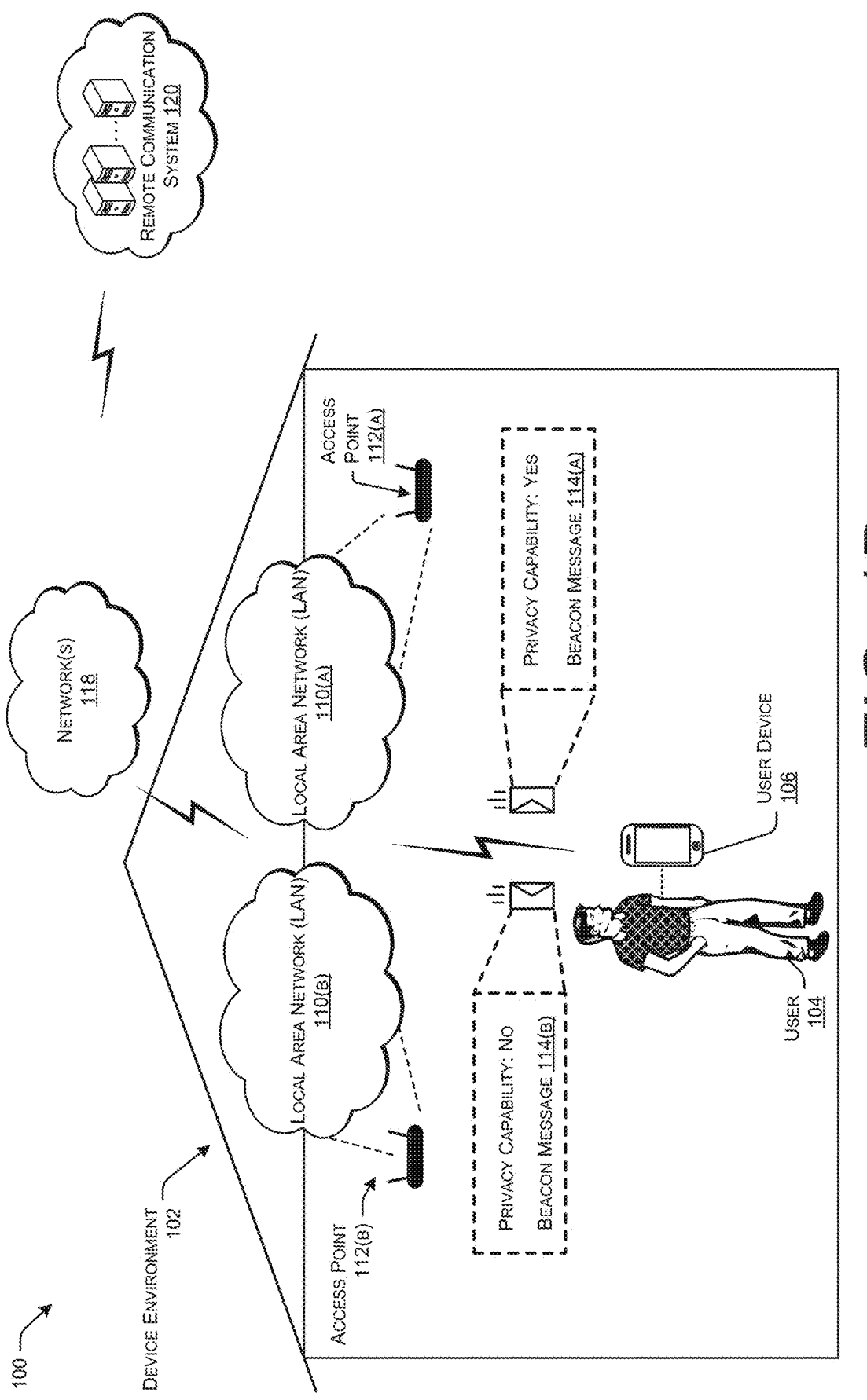
FIG. 1B illustrates the example environment of FIG. 1A in which the user device receives multiple beacon messages from different access points.

FIG. 1B illustrates the example environment 100 of FIG. 1A in which the user device 106 receives a beacon message 114(A) from access point 112(A) that operates via a LAN 110(A) as well as a beacon message 114(B) from access point (B) that operates via a LAN 110(B). For example, the user device 106 may communicate with multiple access points, such as access point 112(A) and access point 112(B) within the device environment 102 and may receive beacon messages and/or advertisement messages, such as beacon message 114(A) and beacon message 114(B) from each access point and that indicate the privacy capabilities of each respective access point as well as their respective LANs (e.g., LAN 110(A) and LAN 110(B). For example, the user device 106 may receive the beacon message 114(A) from access point 112(A) indicating that the access point 112(A) is capable of providing IP privacy. In some examples, the user device 106 may receive the beacon message 114(B) from access point 112(B) indicating that the access point 112(B) is not capable of providing IP privacy. In some cases, the user device 106 may communicate (e.g., send IP packets) with a particular access point (e.g., access point 112(A) or access point 112(B)) based on which application and/or web site is being operated via the user device 106 and what privacy settings are associated with each application and/or web site. For instance, if the user device 106 determines that a first application is required to operate with privacy capabilities enabled, the user device 106 may communicate with the access point 112(A) that previously indicated that it provides privacy capabilities. Similarly, if the user device 106 determines that a second application is required to operate with privacy capabilities disabled, the user device 106 may communicate with the access point 112(B) that previously indicated that it does not provide privacy capabilities.

Figure 1C:
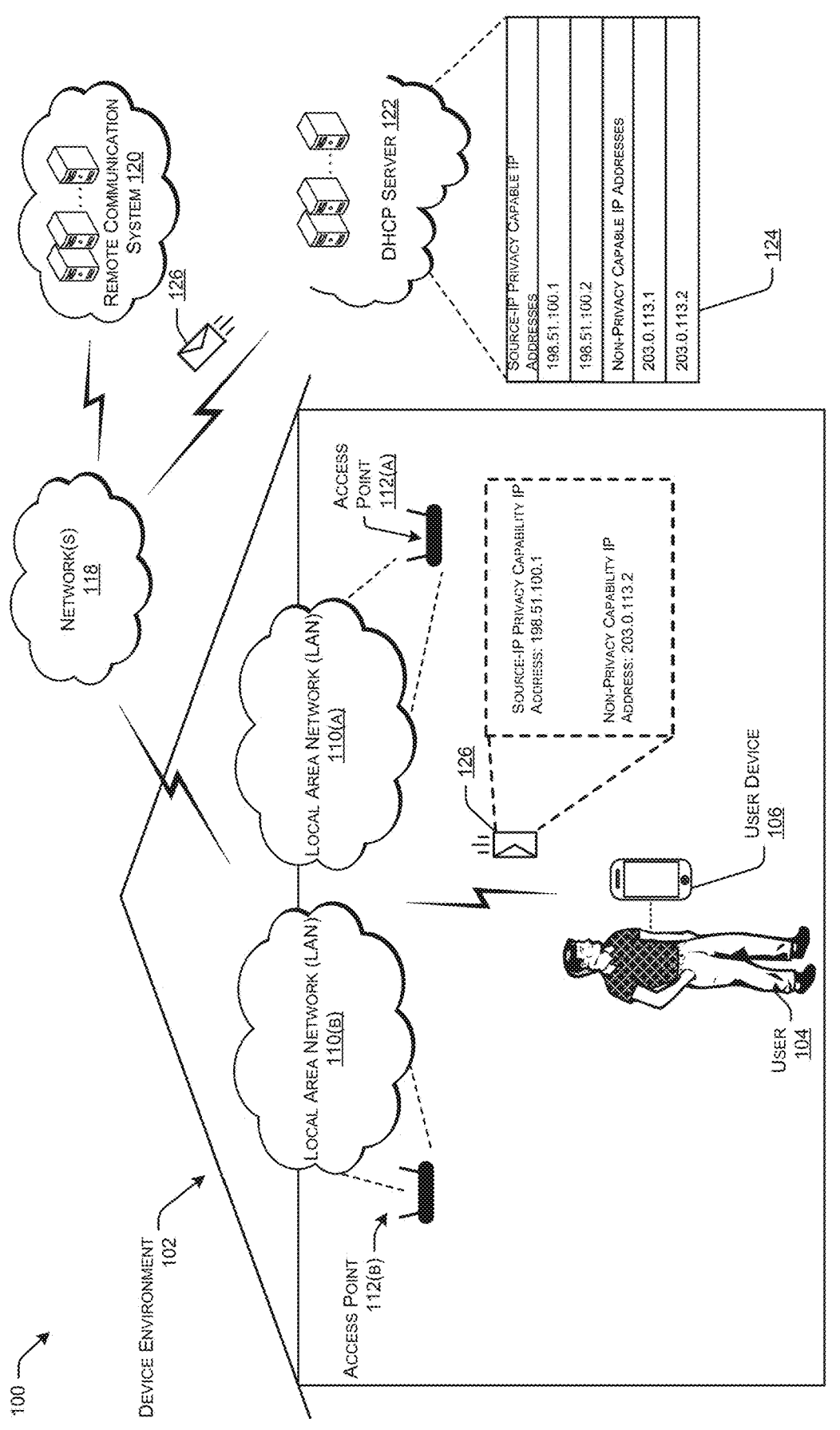
FIG. 1C illustrates the example environment of FIG. 1A in which the user device may receive multiple IP addresses from a Dynamic Host Configuration Protocol (DHCP) server that may be used for privacy capable communication and/or non-privacy capable communication.

FIG. 1C illustrates the example environment 100 of FIG. 1A in which the user device 106 may receive multiple IP addresses from a Dynamic Host Configuration Protocol (DHCP) server 122 that may be used for privacy capable communication and/or non-privacy capable communication. For instance the user device 106 may receive multiple IP addresses to communicate with from the DHCP server 122 that may be used based on if the user device 106 is to operate with privacy capabilities enabled or disabled. For instance, the DHCP server 122 may be configured with IP address range(s) to be allocated to one or more devices, such as the user device 106. The user device 106 may send a request (e.g., a DHCP request) and the DHCP server 122 may send a DHCP response with the allocated IP address. As illustrated in FIG. 1C, these ranges may be marked with a privacy capability. In some cases, access points, such as access point 112(A) and access point 112(B) may be statically configured such that the each access point (e.g., access point 112(A) and access point 112(B) may enable privacy capabilities on traffic matching IP address used from the corresponding range. In some examples, the DHCP server 122, when delivering IP address configurations, may include metadata in the DHCP messages which indicates the privacy property for the allocated address. As the user device 106 participates in address configuration (e.g., IPv4 address configuration using DHCPv4 or DHCPv6), an option may be included for requesting an IP address from the IP address pool 124 that, when observed by the access point 112(A) and/or the access point 112(B), may automatically enable IP privacy capabilities. In response, the DHCP server 122 may allocate an IP address from the IP address pool 124 that will have IP privacy support. The IP address pool 124 may also include IP addresses that, when observed by the access point 112(A) and/or the access support 112(B), will automatically not support IP address privacy. For instance, the user 104 may indicate that the user device 106, an application operating on the user device 106, and/or a web site being accessed by the user device 106, should communicate (e.g., send IP packets) with privacy capabilities being enabled or disabled. Based on the privacy setting indicated by the user for the user device 106, the applications, and/or the websites, the user device 106 may determine which of the IP address should be used for communication in order to enable IP privacy capabilities or disable privacy capabilities. In some cases, both of the IP address (e.g., the privacy capable IP address and the non-privacy capable IP address) may be sent to the user device 106 from the DCHP server 122 via a message 126. In some examples, the user device 106 may support IPV6 and utilize Stateless Auto-address configuration (SLAAC) support and receive privacy capability indications as an IPV6 prefix. For example, an IPV6 prefix CAFE::1/64 may be tagged as a prefix with privacy capabilities enabled and another IPV6 prefix BABA::1/64 may be tagged as a prefix with privacy capabilities disabled (e.g., no IP privacy support). In some case, the user device 106 may generate IPV6 address for these prefixes and, based on the IP privacy needs, perform the source address selection for the applications and/or web sites operating on the user device. The indication of the privacy properties may define new provisioning domain (PvD) options, defined in RFC 8801, or as extended JSON elements to be quired by the user device 106 using PvD URL. Although some of the techniques described herein are with respect to certain communication protocols, such as WLAN protocols (e.g., 802.11 protocols), PAN protocols (e.g., BLE), other types of communication protocols and/or networks may similarly utilize the techniques described herein. Although some examples are illustrated using IPV6 or IPv4, it is understood that the privacy IP privacy capabilities may be enabled and/or disabled regardless of which type of address is being used and can be implemented in both IPV6 and IPV4 communications.

Figure 1D:
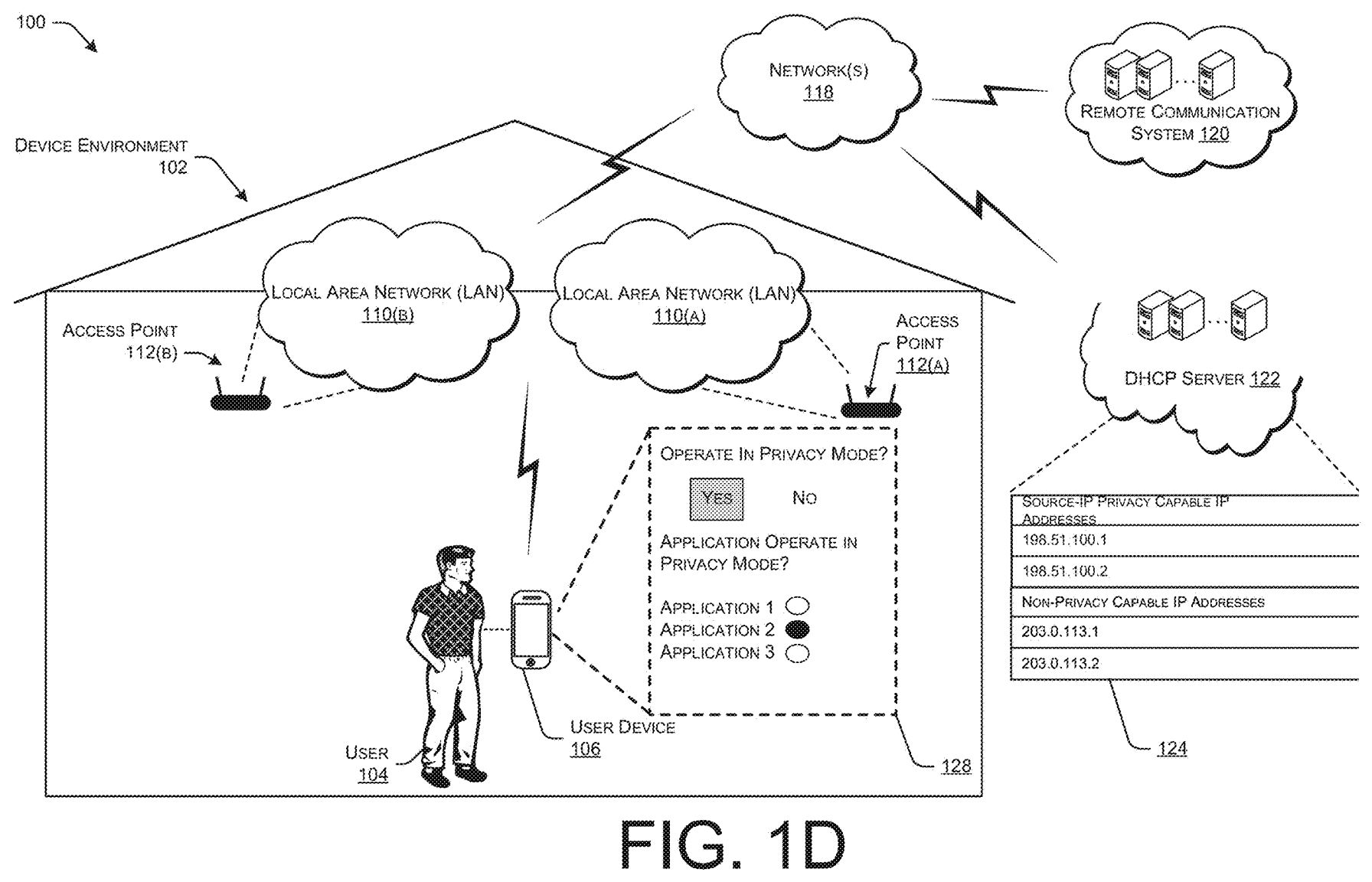

FIG. 1D illustrates the example environment 100 of FIG. 1A in which the user device 106 may present selectable options 128 for operating with IP privacy capabilities enabled and/or disabled. For example, once the user device 106 receives the beacon message 114(A), the beacon message 114(B), and/or the message 126, the user device 106 may determine the IP privacy capabilities available via the access point 112(A) and the access point 112(B). Once the IP privacy capabilities are determined, the user device 106 may present selectable options 128 to the user 104 for configuring the user device 106, an application operating on the user device 106 (e.g., "application 1," "application 2," and/or "application 3"), and/or a web site being accessed by the user device 106, should communicate (e.g., send IP packets) with privacy capabilities being enabled or disabled. In some cases, based on the privacy setting indicated by the user for the user device 106, the applications, and/or the websites, the user device 106 may determine which access point (e.g., access point 112(A), or access point 112(B), should be used for communication in order to operate with IP privacy capabilities enabled or disabled. In some cases, based on the privacy setting indicated by the user for the user device 106, the applications, and/or the websites, the user device 106 may determine which of the IP address should be used for communication in order to enable IP privacy capabilities or disable privacy capabilities. In some cases, the device 106 may operate with a single IP address, and may determine to enable IP privacy capabilities based on the privacy settings indicated by the user using the single IP address (e.g., by accessing a privacy capable access point and/or by accessing a non-privacy capable access point). In some cases, the network 118 may include a policy on which applications are subject to a particular privacy policy. For example, the user device 106 may receive an indication from the network 118 (e.g., using 802.11 or some out of band protocols) that indicates which applications will be configured to automatically operate using privacy capabilities enabled and which application will not be configured to automatically operate using privacy capabilities enabled. In some examples, when the user device 106 connects to the network 118, the indications received from the network 118 regarding the privacy policies may automatically cause the privacy capabilities to be enabled and/or disabled based on which application is being operated.

Figure 1E:
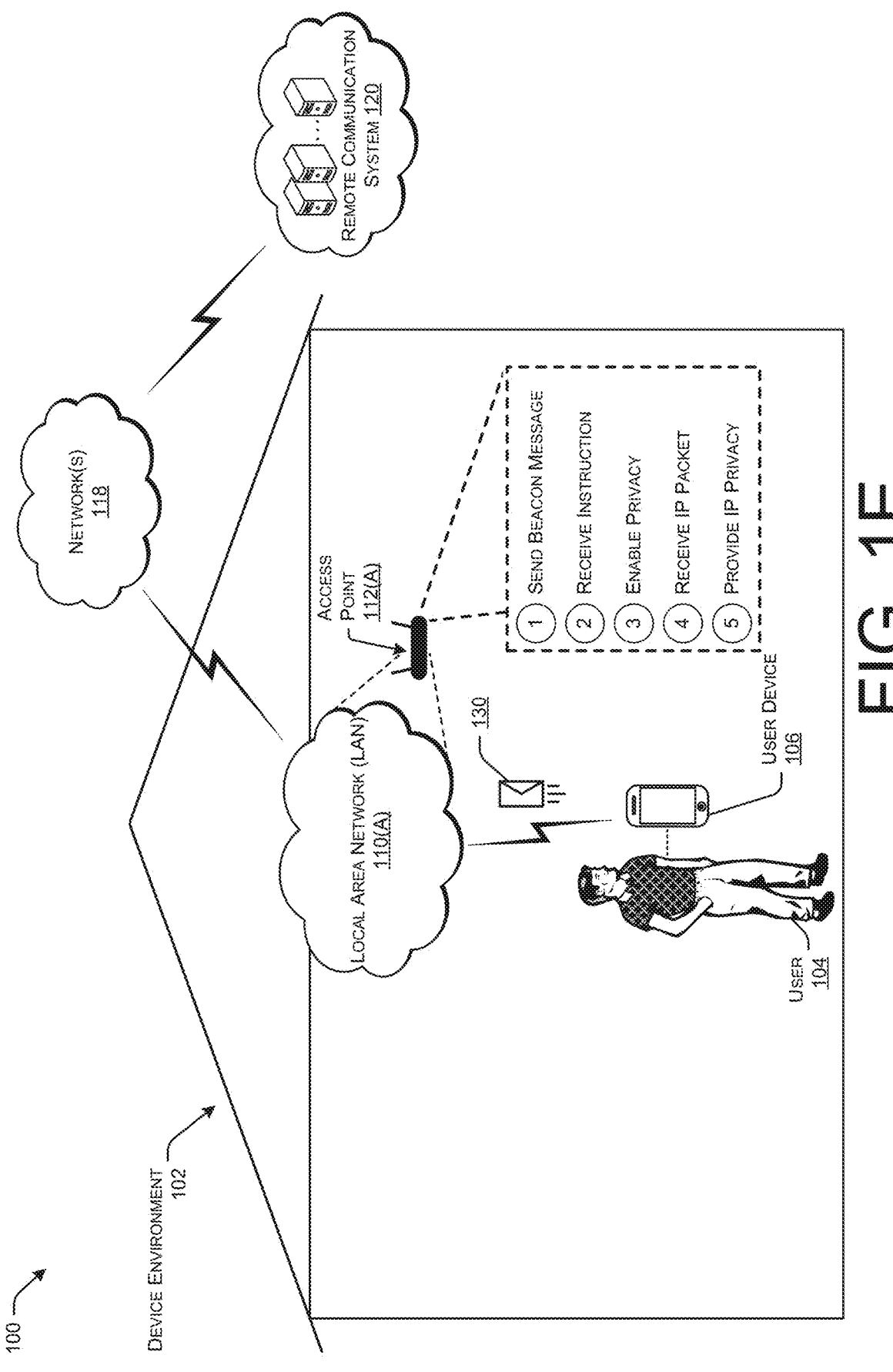
FIG. 1E illustrates another example environment of FIG. 1A in which the access point may indicate IP privacy capabilities and enable IP privacy capabilities during a communication session.

FIG. 1E illustrates the example environment 100 of FIG. 1A in which the access point 112(A) may offer IP privacy capabilities to the UE 106 and provide IP privacy for an IP address of the UE 106 as the UE 106 communicates via the access point 112(A). For example, at step "1," the access point 112(A) may send a beacon message, such as the beacon message 114(A), to the user device 106. In some examples, the beacon message may comprise a BLE advertisement message, or "beacon," that is transmitted using a radio transmitter and according to the BLE protocol. The access point 112(A) may continuously/periodically send beacon messages within the device environment using a PAN protocol, such as BLE. The beacon message(s) may include various types of data and/or metadata. For instance, the beacon message may indicate privacy capabilities of the access point 112(A) and, in some cases, a network (e.g., LAN 110(A), network(s) 118, an Internet, etc.) that the access point 112(A) is in communication with. In some examples, the access point 112(A) may send the beacon via an Access Network Query Protocol (ANQP) query using a Generic Advertising Service (GAS) request frame.

At step "2," the access point 112(A) may receive an instruction (e.g., a privacy setting instruction) from the user device 106 and at step "3," may enable IP privacy capabilities (e.g., source-IP privacy capabilities) in response to the instruction including user input indicating that the user would like the IP privacy capabilities enabled. For example, once the user device 106 receives user input indicating if the user device 106 is to operate with privacy capabilities enabled and/or which applications and/or web sites are to operate with privacy capabilities enabled, the user device 106 may send an instruction to the access point 112(A) to enable and/or disable the privacy capabilities during a communication session with the user device 106 and/or with a particular application and/or web site operating on the user device 106. In some cases, the instruction to enable and/or disable the device privacy capabilities during the communication session may include a bit or a flag included in an association request for joining a basic service set (BSS). In some examples, the instruction to enable and/or disable the device privacy capabilities during the communication session may be perform during 802.1x and/or EAP authentication procedures. In this way, the user device 106 may establish the privacy capabilities to be utilized during a communication session with the access point 112(A) during the link layer phase of communication such that the privacy capabilities are enabled (e.g., or disabled) prior to IP data packets associated with a particular application and/or web site are sent via the network 118.

At step "4," the access point 112(A) may receive an IP data packet 130 from the user device 106 and at step "5" the access point 112(A) may provide IP address privacy (e.g., source-IP privacy capabilities) to the user device 106. For example, the access point 112(A) may provide IP address privacy to the user device 106 according to a number of different techniques, including Network Address Translation (NAT). By way of example, the access point 112(A) may implement techniques defined by Request for Comments (RFC) 6296 (IPv6 IPV6-to-IPv6 Network Prefix Translation), RFC 7157 (Multihoming without Network Address Translation), RFC 6877 (Combination of Stateful and Stateless Translation), and/or RFC 6052 (Addressing of IPV4/IPv6 Translators).

Figure 2A:
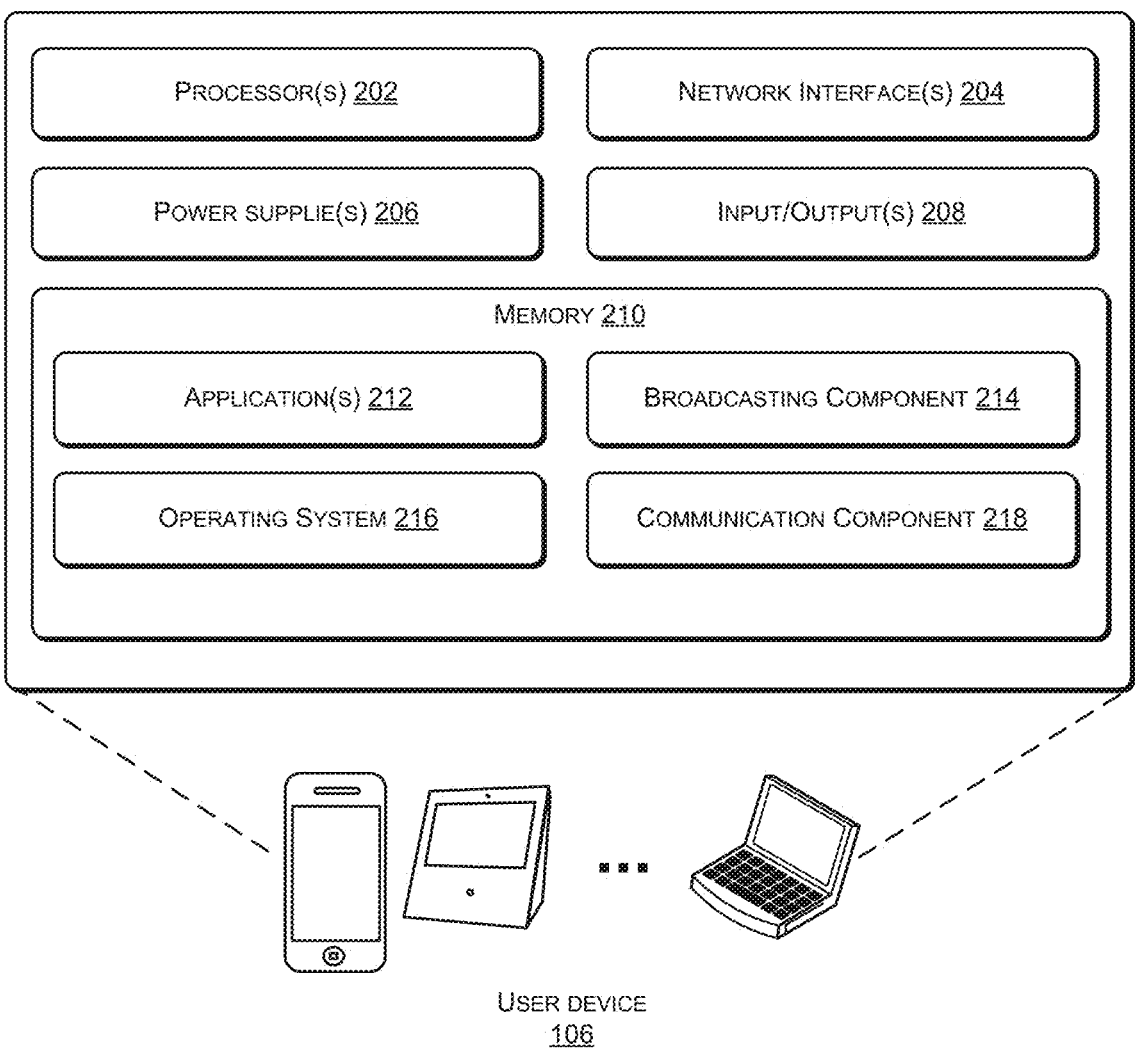
FIG. 2A illustrates example components of the user device of FIGS. 1A-1E.

FIG. 2A illustrates example components of the user device 106 of FIGS. 1A-1E. As illustrated, the user device 106 may comprise any type of user device 106, such as voice-controlled assistants, tablet computing devices, smart televisions (TVs), laptop computer, desktop computers, mobile phones, display devices, audio devices, gaming devices, and/or the like.

The user device 106 may include one or more processors 202, one or more network interfaces 204, and one or more power supplies 206. The processors 202 may include a central processing unit (CPU) for processing data and computer-readable instructions, and the network interfaces 204 may enable the user device 106 to communicate with other devices and may be a radio, network interface card (NIC), software components, and/or any other hardware, software, or any combination thereof to enable the user device 106 to communicate over various networks and using various protocols.

The user device 106 may include one or more input/outputs 208, such as buttons, displays, touch screens, microphones, speakers, lights, sensors, haptic sensors, and/or any other means to receive inputs and provide outputs.

Further, the user device 106 may include memory 210 and may store or include computer-readable instructions that are executable on the processor(s) 202. The memory 210 may individually include volatile random access memory (RAM), non-volatile read only memory (ROM), non-volatile magnetoresistive (MRAM) and/or other types of memory. As illustrated, the memory 210 may store one or more applications 212 that provide various functionality for the user device 106, depending on the type of device 106. Further, the memory 210 may store a broadcasting component 214 that enables the user device 106 to receive a beacon message and/or advertisement to establish IP privacy capabilities during a communication session.

Further, the memory 210 may store an operating system 216 that includes software that supports a computer's basic functions, such as scheduling tasks, executing applications, controlling peripherals, etc. Further, the memory 210 may store a communication component 218 that performs the communications described herein. For instance, the communication component 218 may enable the user device to communicate, using the network interface(s) 204, with other devices, such as the access point 112(A) and the access point 112(B).

Figure 2B:
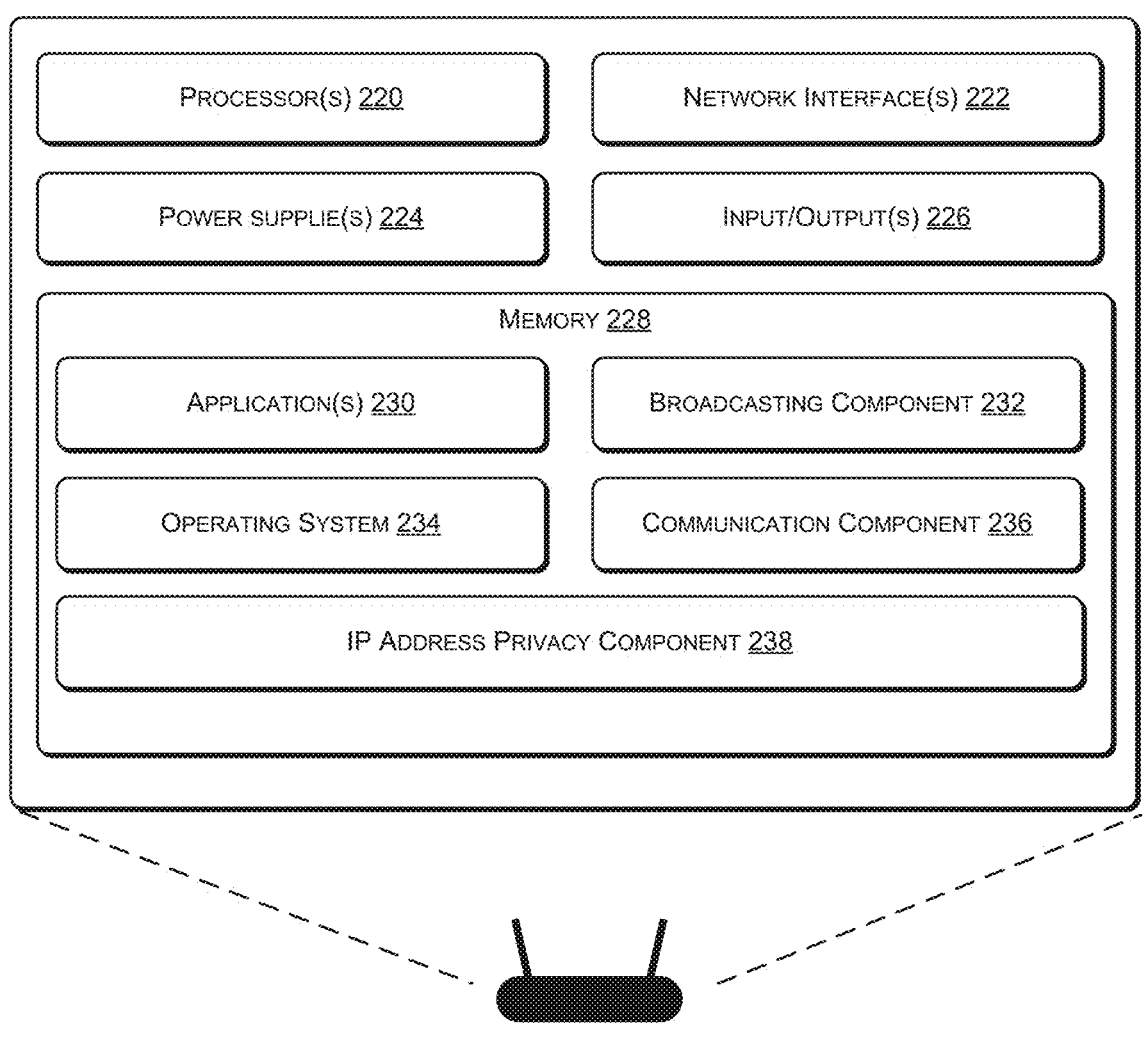
FIG. 2B illustrates example components of the access point of FIGS. 1A-1E.

FIG. 2B illustrates example components of the access point 112 (e.g., access point 112(A) and/or access point 112(B)) of FIGS. 1A-1E. As illustrated, the access point 112 may comprise any type of access point that provides a local area network (LAN). The LAN may comprise any type of LAN, including any combination of wired and/or wireless LANs (e.g., WLANS), such as campus area networks (CANs), metropolitan area networks (MANs), etc. In some instances, the LAN 110(A) may comprise a network that follows an IEEE 802.11 standard, or a "WiFi" network.

The access point 112 may include one or more processors 220, one or more network interfaces 222, and one or more power supplies 224. The processors 220 may include a central processing unit (CPU) for processing data and computer-readable instructions, and the network interfaces 222 may enable the access point 112 to communicate with other devices and may be a radio, network interface card (NIC), software components, and/or any other hardware, software, or any combination thereof to enable the access point 112 to communicate over various networks and using various protocols.

The access point 112 may include one or more input/outputs 226, such as buttons, displays, touch screens, microphones, speakers, lights, sensors, haptic sensors, and/or any other means to receive inputs and provide outputs.

Further, the access point 112 may include memory 228 and may store or include computer-readable instructions that are executable on the processor(s) 220. The memory 228 may individually include volatile random access memory (RAM), non-volatile read only memory (ROM), non-volatile magnetoresistive (MRAM) and/or other types of memory. As illustrated, the memory 228 may store one or more applications 230 that provide various functionality for the access point 112, depending on the type of access point 112. Further, the memory 228 may store a broadcasting component 232 that enables the access point 112 to send a beacon message and/or advertisement to establish IP privacy capabilities during a communication session.

Further, the memory 228 may store an operating system 234 that includes software that supports a computer's basic functions, such as scheduling tasks, executing applications, controlling peripherals, etc. Further, the memory 228 may store a communication component 236 that performs the communications described herein. For instance, the communication component 236 may enable the user device to communicate, using the network interface(s) 222, with other devices, such as the user device 106, the remote communication system 120, and/or the DHCP server 122 (e.g., via the network 118). Further, the memory 228 may store an IP address privacy component 238 that performs the IP privacy capabilities discussed herein. For instance, the access point 112 may provide IP address privacy, via the IP address privacy component 238, to the user device 106 according to a number of different techniques, including Network Address Translation (NAT). By way of example, the IP address privacy component 238 may implement techniques defined by Request for Comments (RFC) 6296 (IPv6 IPv6-to-IPv6 Network Prefix Translation), RFC 7157 (Multihoming without Network Address Translation), RFC 6877 (Combination of Stateful and Stateless Translation), and/or RFC 6052 (Addressing of IPV4/IPv6 Translators).

FIGS. 3A-6 illustrate flow diagrams of example processes 300(A), 300(B), 400, 500, and 600 for performing the techniques described herein. The processes 300(A), 300(B), 400, 500, and 600, as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

FIG. 3A illustrates an example process 300(A) for a user device 106 to determine that IP privacy capabilities are available via a wireless local area network (WLAN) 110. In some instances, the method 300(A) may be performed by a first device (e.g., user device 106) comprising one or more processors, and one or more computer-readable media storing computer-executable instructions that, when executed by the one or more processors, cause the one or more processors to perform operations of method 300(A).

At 302(A), the process 300(A) includes establishing a connection between the source device and an access point using a communication protocol. For example, a user device may be configured to connect to one or more networks, such as a WLAN and ultimately an Internet, and perform actions on behalf of users (e.g., streaming music and videos, purchasing items, controlling other devices and appliances, searching the Internet, and so forth).

At 304(A), the process 300(A) includes receiving, from the access point, a beacon message that includes a source device privacy capability indication to provide privacy for an IP address associated with the source device while communicating with the access point. For example, the user device 106 may receive a beacon message 114(A) from the access point 112(A)(e.g., establishing a connection with the access point 112(A)). In some examples, the beacon message 114(A) may comprise a BLE advertisement message, or "beacon," that is transmitted using a radio transmitter and according to the BLE protocol. The user device 106 may receive a single beacon message 114(A), or continuously/periodically receive beacon messages 114(A) from access points, such as access point 112(A) within the device environment using a PAN protocol, such as BLE. The beacon message(s) 114(A) may include various types of data and/or metadata. For instance, the beacon message 114(A) may indicate privacy capabilities of the access point 112(A) and, in some cases, a network (e.g., LAN 110, network(s) 118, an Internet, etc.) that the access point 112(A) is in communication with. In some examples, the user device 106 may determine the privacy capabilities of the access point 112(A)(e.g., receive the beacon message 114(A)) by responding to an Access Network Query Protocol (ANQP) query using a Generic Advertising Service (GAS) request frame.

At 306(A), the process 300(A) includes receiving, at the source device, user input including an instruction to enable the source device privacy capability. For instance, the user device 106 may present a selectable option for the user 104 to provide user input that indicates whether or not the user 104 desires to communicate with the privacy capabilities of the access point 112(A) enabled or disabled. In some cases, the selectable option may be presented in response to the user device 106 establishing an initial communication with the access point 112(A). In some cases, the selectable option may be presented in response to the user 104 opening an application on the user device 106 and/or accessing a web page via a web browser operating on the user device 106. For example, there may be instances in which the user 104 desires for a first application to operate with privacy capabilities enabled while a second different application operates with privacy capabilities disabled. For instance, it may be beneficial for a banking application to operate with privacy capabilities enabled while a ride sharing application may require some amount of identifying data (e.g., geolocation) in order to operate properly.

At 308(A), the process 300(A) includes sending, from the source device to the access point, an instruction to enable the source device privacy capability during a communication session. For example, based on the input received form the user 104, the user device 106 may send a privacy capability instruction to the access point 112(A). For example, once the user device 106 receives user input indicating if the user device 106 is to operate with privacy capabilities enabled and/or which applications and/or web sites are to operate with privacy capabilities enabled, the user device 106 may send an instruction to the access point 112(A) to enable and/or disable the privacy capabilities during a communication session with the user device 106 and/or with a particular application and/or web site operating on the user device 106. In some cases, the instruction to enable and/or disable the device privacy capabilities during the communication session may include a bit or a flag included in an association request for joining a basic service set (BSS). In some examples, the instruction to enable and/or disable the device privacy capabilities during the communication session may be perform during 802.1x and/or EAP authentication procedures. In this way, the user device 106 may establish the privacy capabilities to be utilized during a communication session with the access point 112(A) during the link layer phase of communication such that the privacy capabilities are enabled (e.g., or disabled) prior to IP data packets associated with a particular application and/or web site are sent via the network 118.

At 310(A), the process 300(A) includes sending, from the source device to the access point, one or more IP packets that include data using the source device privacy capability. For example, once the privacy capabilities of the access point 112(A) are enabled and/or disabled, the user device 106 may proceed to communicate (e.g., send IP packets associated with an application and/or a web site) using the desired privacy capabilities. For instance, the user device 106 may have connectivity to the LAN 110 and transmit data packets via the LAN 110 and over one or more networks 118 (e.g., the Internet).

FIG. 3B illustrates an example process 300(B) for an access point 112 to inform that IP privacy capabilities are available via a wireless local area network (WLAN) 110 and to provide IP privacy capabilities during a communication session. In some instances, the method 300(B) may be performed by a first device (e.g., access point 112) comprising one or more processors, and one or more computer-readable media storing computer-executable instructions that, when executed by the one or more processors, cause the one or more processors to perform operations of method 300(B).

At 302(B), the process 300(B) includes establishing a connection between the access point and a source device using a communication protocol. For example, a user device may be configured to connect to one or more networks, such as a WLAN and ultimately an Internet, and perform actions on behalf of users (e.g., streaming music and videos, purchasing items, controlling other devices and appliances, searching the Internet, and so forth) via the access point 112.

At 304(B), the process 300(B) includes sending, to the source device, a beacon message that includes a source device privacy capability indication to provide privacy for an IP address associated with the source device while communicating with the access point. For example, the user device 106 may receive a beacon message 114(A) from the access point 112(A)(e.g., establishing a connection with the access point 112(A)). In some examples, the beacon message 114(A) may comprise a BLE advertisement message, or "beacon," that is transmitted using a radio transmitter and according to the BLE protocol. The user device 106 may receive a single beacon message 114(A), or continuously/periodically receive beacon messages 114(A) from access points, such as access point 112(A) within the device environment using a PAN protocol, such as BLE. The beacon message(s) 114(A) may include various types of data and/or metadata. For instance, the beacon message 114(A) may indicate privacy capabilities of the access point 112(A) and, in some cases, a network (e.g., LAN 110, network(s) 118, an Internet, etc.) that the access point 112(A) is in communication with. In some examples, the user device 106 may determine the privacy capabilities of the access point 112 (A)(e.g., receive the beacon message 114(A)) by responding to an Access Network Query Protocol (ANQP) query using a Generic Advertising Service (GAS) request frame.

At 306(B), the process 300(B) includes receiving, from the source device, an instruction to enable the source device privacy capability during a communication session. For example, based on the input received form the user 104, the user device 106 may send a privacy capability instruction to the access point 112(A). For example, once the user device 106 receives user input indicating if the user device 106 is to operate with privacy capabilities enabled and/or which applications and/or web sites are to operate with privacy capabilities enabled, the user device 106 may send an instruction to the access point 112(A) to enable and/or disable the privacy capabilities during a communication session with the user device 106 and/or with a particular application and/or web site operating on the user device 106. In some cases, the instruction to enable and/or disable the device privacy capabilities during the communication session may include a bit or a flag included in an association request for joining a basic service set (BSS). In some examples, the instruction to enable and/or disable the device privacy capabilities during the communication session may be perform during 802.1x and/or EAP authentication procedures. In this way, the user device 106 may establish the privacy capabilities to be utilized during a communication session with the access point 112(A) during the link layer phase of communication such that the privacy capabilities are enabled (e.g., or disabled) prior to IP data packets associated with a particular application and/or web site are sent via the network 118.

At 308(B), the process 300(B) includes enabling IP privacy address capabilities and at 310(B), the process 300(B) includes receiving, from the source device, one or more IP packets that include data using the source device privacy capability. For example, once the privacy capabilities of the access point 112(A) are enabled and/or disabled, the user device 106 may proceed to communicate (e.g., send IP packets associated with an application and/or a web site) using the desired privacy capabilities. For instance, the user device 106 may have connectivity to the LAN 110 and transmit data packets via the LAN 110 and over one or more networks 118 (e.g., the Internet).

At 312(B), the process 300(B) includes performing IP address privacy capabilities during the communication session. For example, the access point 112(A) may provide IP address privacy to the user device 106 according to a number of different techniques, including Network Address Translation (NAT). By way of example, the access point 112(A) may implement techniques defined by Request for Comments (RFC) 6296 (IPv6 IPv6-to-IPV6 Network Prefix Translation), RFC 7157 (Multihoming without Network Address Translation), RFC 6877 (Combination of Stateful and Stateless Translation), and/or RFC 6052 (Addressing of IPV4/IPv6 Translators).

FIG. 4 illustrates a flow diagram of an example method 400 for a user device to communicate with multiple access points determined by IP privacy capabilities provided by the access points. In some instances, the method 400 may be performed by a first device (e.g., user device 106) comprising one or more processors, and one or more computer-readable media storing computer-executable instructions that, when executed by the one or more processors, cause the one or more processors to perform operations of method 400.

At 402, the process 400 includes establishing a first connection between the device and a first access point. For example, a user device may be configured to connect to one or more networks, such as a WLAN and ultimately an Internet, and perform actions on behalf of users (e.g., streaming music and videos, purchasing items, controlling other devices and appliances, searching the Internet, and so forth).

At 404, the process 400 includes receiving, from the first access point, a first beacon message that includes a source device privacy capability indication to provide privacy for an IP address associated with the device while communicating with the first access point. For example, the user device 106 may receive a beacon message 114(A) from access point 112(A) as well as a beacon message 114(B) from access point (B). For example, the user device 106 may communicate with multiple access points, such as access point 112(A) and access point 112(B) within the device environment 102 and may receive beacon messages and/or advertisement messages, such as beacon message 114(A) and beacon message 114(B) from each access point and that indicate the privacy capabilities of each respective access point.

At 406, the process 400 includes establishing a second connection between the device and a second access point and at 408, the process 400 includes receiving a second beacon message associated with the second access point.

At 410, the process 400 includes determining, based at least in part on the second beacon message, that the second access point does not include the device privacy capability indication.

At 412, the process 400 includes determining to utilize the first access point for a first communication session associated with a first application based at least in part on a first privacy setting associated with the first application and at 414, the process 400 includes determining to utilize the second access point for a second communication session associated with a second application based at least in part a second privacy setting associated with the second application. For example, the user device 106 may receive the beacon message 114(A) from access point 112(A) indicating that the access point 112(A) is capable of providing IP privacy. In some examples, the user device 106 may receive the beacon message 114(B) from access point 112(B) indicating that the access point 112(B) is not capable of providing IP privacy. In some cases, the user device 106 may communicate (e.g., send IP packets) with a particular access point (e.g., access point 112(A) or access point 112(B)) based on which application and/or web site is being operated via the user device 106 and what privacy settings are associated with each application and/or web site. For instance, if the user device 106 determines that a first application is required to operate with privacy capabilities enabled, the user device 106 may communicate with the access point 112(A) that previously indicated that it provides privacy capabilities. Similarly, if the user device 106 determines that a second application is required to operate with privacy capabilities disabled, the user device 106 may communicate with the access point 112(B) that previously indicated that it does not provide privacy capabilities.

FIG. 5 illustrates a flow diagram of an example method 500 for a user device to communicate with an access point using different IP privacy capabilities. In some instances, the method 500 may be performed by a first device (e.g., user device 106) comprising one or more processors, and one or more computer-readable media storing computer-executable instructions that, when executed by the one or more processors, cause the one or more processors to perform operations of method 500.

At 502, the process 500 includes establishing a connection between the device and an access point. For example, a user device may be configured to connect to one or more networks, such as a WLAN and ultimately an Internet, and perform actions on behalf of users (e.g., streaming music and videos, purchasing items, controlling other devices and appliances, searching the Internet, and so forth).

At 504, the process 500 includes receiving, from the access point, a beacon message that indicates that the access point is capable of operating in a first setting in which source device privacy capabilities are enables and operating in a second setting in which source device privacy capabilities are disabled. For example, the user device 106 may receive a beacon message 114(A) from the access point 112(A)(e.g., establishing a connection with the access point 112(A)). In some examples, the beacon message 114(A) may comprise a BLE advertisement message, or "beacon," that is transmitted using a radio transmitter and according to the BLE protocol. The user device 106 may receive a single beacon message 114(A), or continuously/periodically receive beacon messages 114(A) from access points, such as access point 112(A) within the device environment using a PAN protocol, such as BLE. The beacon message(s) 114(A) may include various types of data and/or metadata. For instance, the beacon message 114(A) may indicate privacy capabilities of the access point 112(A) and, in some cases, a network (e.g., LAN 110, network(s) 118, an Internet, etc.) that the access point 112(A) is in communication with. In some examples, the user device 106 may determine the privacy capabilities of the access point 112(A)(e.g., receive the beacon message 114(A)) by responding to an Access Network Query Protocol (ANQP) query using a Generic Advertising Service (GAS) request frame.

At 506, the process 500 includes determining to utilize the first setting of the access point for a first communication session associated with a first application based at least in part on a first privacy setting associated with the first application and at 508, the process 500 includes determining to utilize the second setting of the access point for a second communication session associated with a second application based at least in part a second privacy setting associated with the second application. For example, the user device 106 may present selectable options 128 for operating with IP privacy capabilities enabled and/or disabled. For example, once the user device 106 receives the beacon message 114(A), the beacon message 114(B), and/or the message 126, the user device 106 may determine the IP privacy capabilities available via the access point 112(A) and the access point 112(B). Once the IP privacy capabilities are determined, the user device 106 may present selectable options 128 to the user 104 for configuring the user device 106, an application operating on the user device 106 (e.g., "application 1," "application 2," and/or "application 3"), and/or a web site being accessed by the user device 106, should communicate (e.g., send IP packets) with privacy capabilities being enabled or disabled. In some cases, based on the privacy setting indicated by the user for the user device 106, the applications, and/or the websites, the user device 106 may determine which access point (e.g., access point 112(A), or access point 112(B), should be used for communication in order to operate with IP privacy capabilities enabled or disabled. In some cases, based on the privacy setting indicated by the user for the user device 106, the applications, and/or the websites, the user device 106 may determine which of the IP address should be used for communication in order to enable IP privacy capabilities or disable privacy capabilities.

FIG. 6 illustrates a flow diagram of an example method 600 for a user device to receive multiple IP addresses having different IP privacy capabilities from a DHCP server. In some instances, the method 600 may be performed by a first device (e.g., user device 106) comprising one or more processors, and one or more computer-readable media storing computer-executable instructions that, when executed by the one or more processors, cause the one or more processors to perform operations of method 600.

At 602, the process 600 includes receiving, at a source device and from a DHCP server, a first IP address associated with source device privacy capability. For example, the user device 106 may receive multiple IP addresses from a Dynamic Host Configuration Protocol (DHCP) server 122 that may be used for privacy capable communication and/or non-privacy capable communication.

At 604, the process 600 includes receiving, at the source device and from the DHCP server, a second IP address unassociated with source device privacy capability. For instance the user device 106 may receive multiple IP addresses to communicate with from the DHCP server 122 that may be used based on if the user device 106 is to operate with privacy capabilities enabled or disabled.

At 606, the process 600 includes establishing a connection between the source device and an access point using a communication protocol and at 608, the process 600 includes determining a privacy setting associated with an application to be operated by the source device via the access point. For instance the DHCP server 122 may include an IP address pool 124 of IP address ranges received from one or more access points, such as access point 112(A) and access point 112(B) and indication with each IP address as to whether or not the IP address will support privacy capabilities when the IP address is used by the user device 106 during a communication session with the access point.

At 610, the process 600 includes determining a privacy setting associated with an application to be operated by the source device via the access point and at 612, the process 600 includes sending, from the source device to the access point, one or more IP packets that include data using the first IP address or the second IP address. For example, the user device 106 may present selectable options 128 for operating with IP privacy capabilities enabled and/or disabled. For example, once the user device 106 receives the beacon message 114(A), the beacon message 114(B), and/or the message 126, the user device 106 may determine the IP privacy capabilities available via the access point 112(A) and the access point 112(B). Once the IP privacy capabilities are determined, the user device 106 may present selectable options 128 to the user 104 for configuring the user device 106, an application operating on the user device 106 (e.g., "application 1," "application 2," and/or "application 3"), and/or a web site being accessed by the user device 106, should communicate (e.g., send IP packets) with privacy capabilities being enabled or disabled. In some cases, based on the privacy setting indicated by the user for the user device 106, the applications, and/or the websites, the user device 106 may determine which access point (e.g., access point 112(A), or access point 112(B), should be used for communication in order to operate with IP privacy capabilities enabled or disabled. In some cases, based on the privacy setting indicated by the user for the user device 106, the applications, and/or the websites, the user device 106 may determine which of the IP address should be used for communication in order to enable IP privacy capabilities or disable privacy capabilities.

Figure 7:
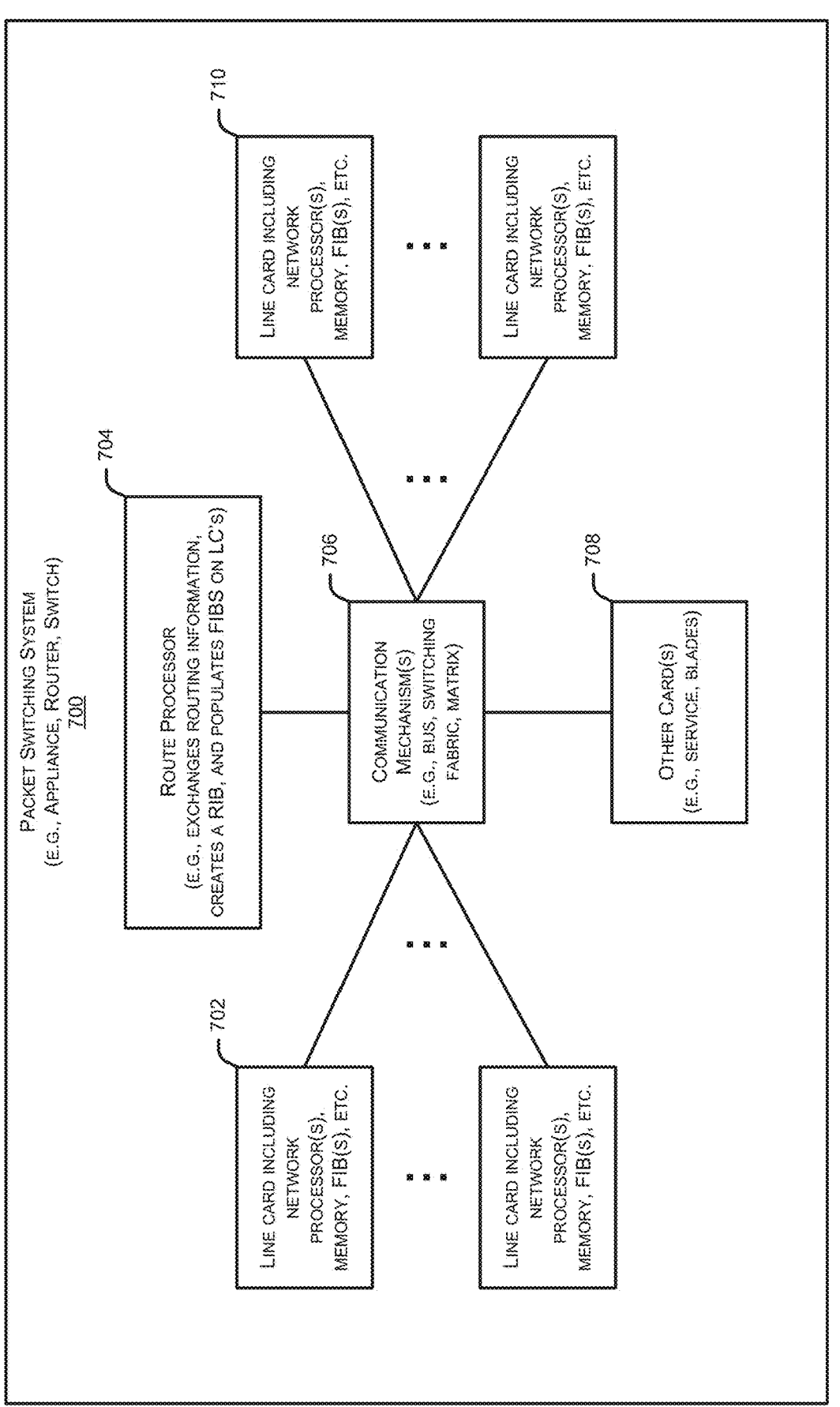
FIG. 7 illustrates a block diagram illustrating an example packet switching system that can be utilized to implement various aspects of the technologies disclosed herein.

FIG. 7 illustrates a block diagram illustrating an example packet switching device (or system) 700 that can be utilized to implement various aspects of the technologies disclosed herein. In some examples, packet switching device(s) 700 may be employed in various networks, such as, for example, network(s) 118, and/or other networks as described with respect to FIGS. 1A-1E.

In some examples, a packet switching device 700 may comprise multiple line card(s) 702, 710, each with one or more network interfaces for sending and receiving packets over communications links (e.g., possibly part of a link aggregation group). The packet switching device 700 may also have a control plane with one or more processing elements 704 for managing the control plane and/or control plane processing of packets associated with forwarding of packets in a network. The packet switching device 700 may also include other cards 708 (e.g., service cards, blades) which include processing elements that are used to process (e.g., forward/send, drop, manipulate, change, modify, receive, create, duplicate, apply a service) packets associated with forwarding of packets in a network. The packet switching device 700 may comprise hardware-based communication mechanism 706 (e.g., bus, switching fabric, and/or matrix, etc.) for allowing its different entities 702, 704, 708 and 710 to communicate. Line card(s) 702, 710 may typically perform the actions of being both an ingress and/or an egress line card 702, 710, in regard to multiple other particular packets and/or packet streams being received by, or sent from, packet switching device 700.

Figure 8:
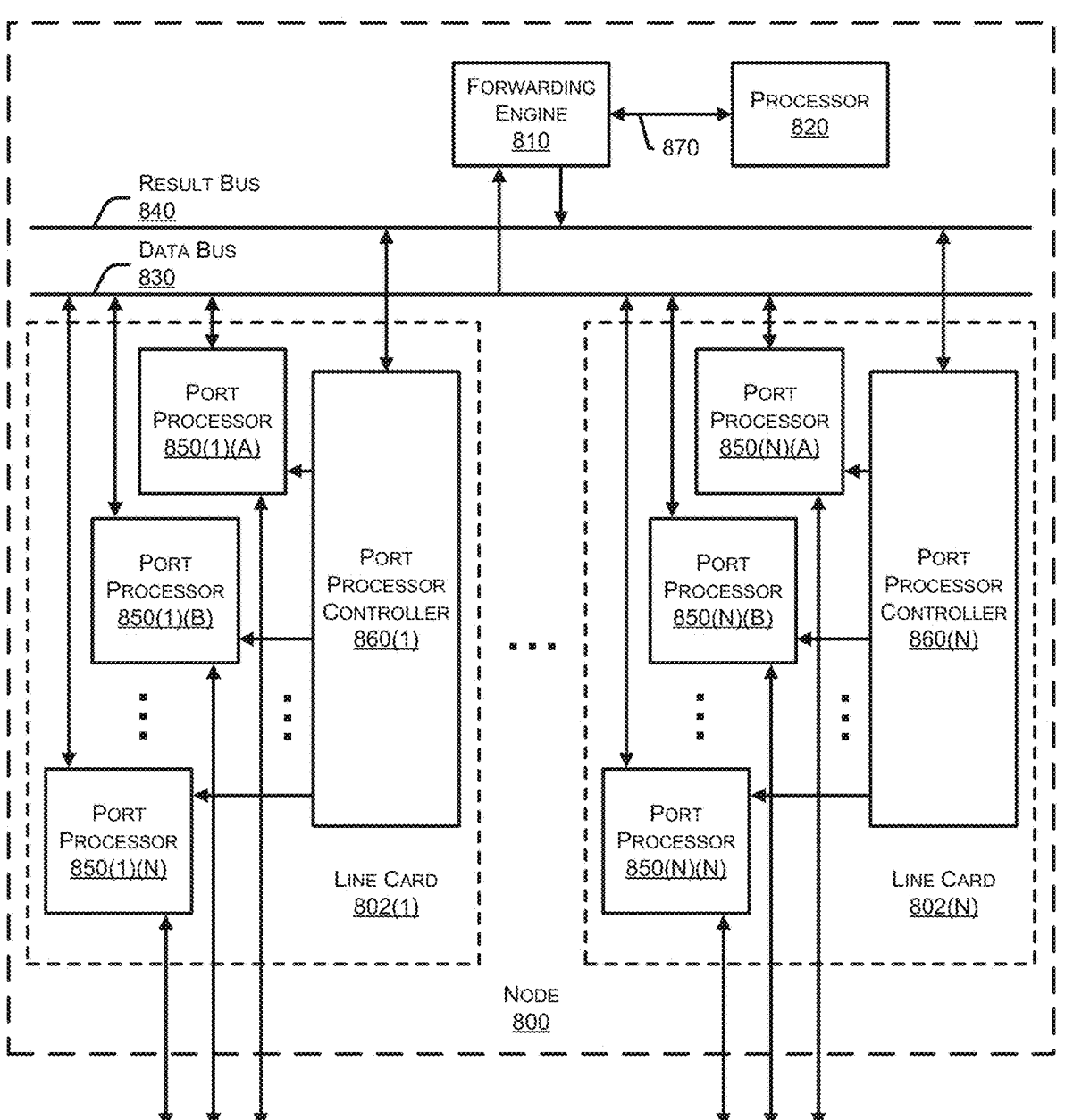
FIG. 8 illustrates a block diagram illustrating certain components of an example node that can be utilized to implement various aspects of the technologies disclosed herein.

FIG. 8 illustrates a block diagram illustrating certain components of an example node 800 that can be utilized to implement various aspects of the technologies disclosed herein. In some examples, node(s) 800 may be employed in various networks, such as, for example, network(s) 118, and/or other networks as described with respect to FIGS. 1A-IE.

In some examples, node 800 may include any number of line cards 802 (e.g., line cards 802(1)-(N), where N may be any integer greater than 1) that are communicatively coupled to a forwarding engine 810 (also referred to as a packet forwarder) and/or a processor 820 via a data bus 830 and/or a result bus 840. Line cards 802(1)-(N) may include any number of port processors 880(1)(A)-(N)(N) which are controlled by port processor controllers 860(1)-(N), where N may be any integer greater than 1. Additionally, or alternatively, forwarding engine 810 and/or processor 820 are not only coupled to one another via the data bus 830 and the result bus 840, but may also communicatively coupled to one another by a communications link 870.

The processors (e.g., the port processor(s) 880 and/or the port processor controller(s) 860) of each line card 802 may be mounted on a single printed circuit board. When a packet or packet and header are received, the packet or packet and header may be identified and analyzed by node 800 (also referred to herein as a router) in the following manner. Upon receipt, a packet (or some or all of its control information) or packet and header may be sent from one of port processor(s) 880(1)(A)-(N)(N) at which the packet or packet and header was received and to one or more of those devices coupled to the data bus 830 (e.g., others of the port processor(s) 880(1)(A)-(N)(N), the forwarding engine 810 and/or the processor 820). Handling of the packet or packet and header may be determined, for example, by the forwarding engine 810. For example, the forwarding engine 810 may determine that the packet or packet and header should be forwarded to one or more of port processors 880(1)(A)-(N)(N). This may be accomplished by indicating to corresponding one(s) of port processor controllers 860 (1)-(N) that the copy of the packet or packet and header held in the given one(s) of port processor(s) 880(1)(A)-(N)(N) should be forwarded to the appropriate one of port processor(s) 880(1)(A)-(N)(N). Additionally, or alternatively, once a packet or packet and header has been identified for processing, the forwarding engine 810, the processor 820, and/or the like may be used to process the packet or packet and header in some manner and/or maty add packet security information in order to secure the packet. On a node 800 sourcing such a packet or packet and header, this processing may include, for example, encryption of some or all of the packet's or packet and header's information, the addition of a digital signature, and/or some other information and/or processing capable of securing the packet or packet and header. On a node 800 receiving such a processed packet or packet and header, the corresponding process may be performed to recover or validate the packet's or packet and header's information that has been secured.

Figure 9:
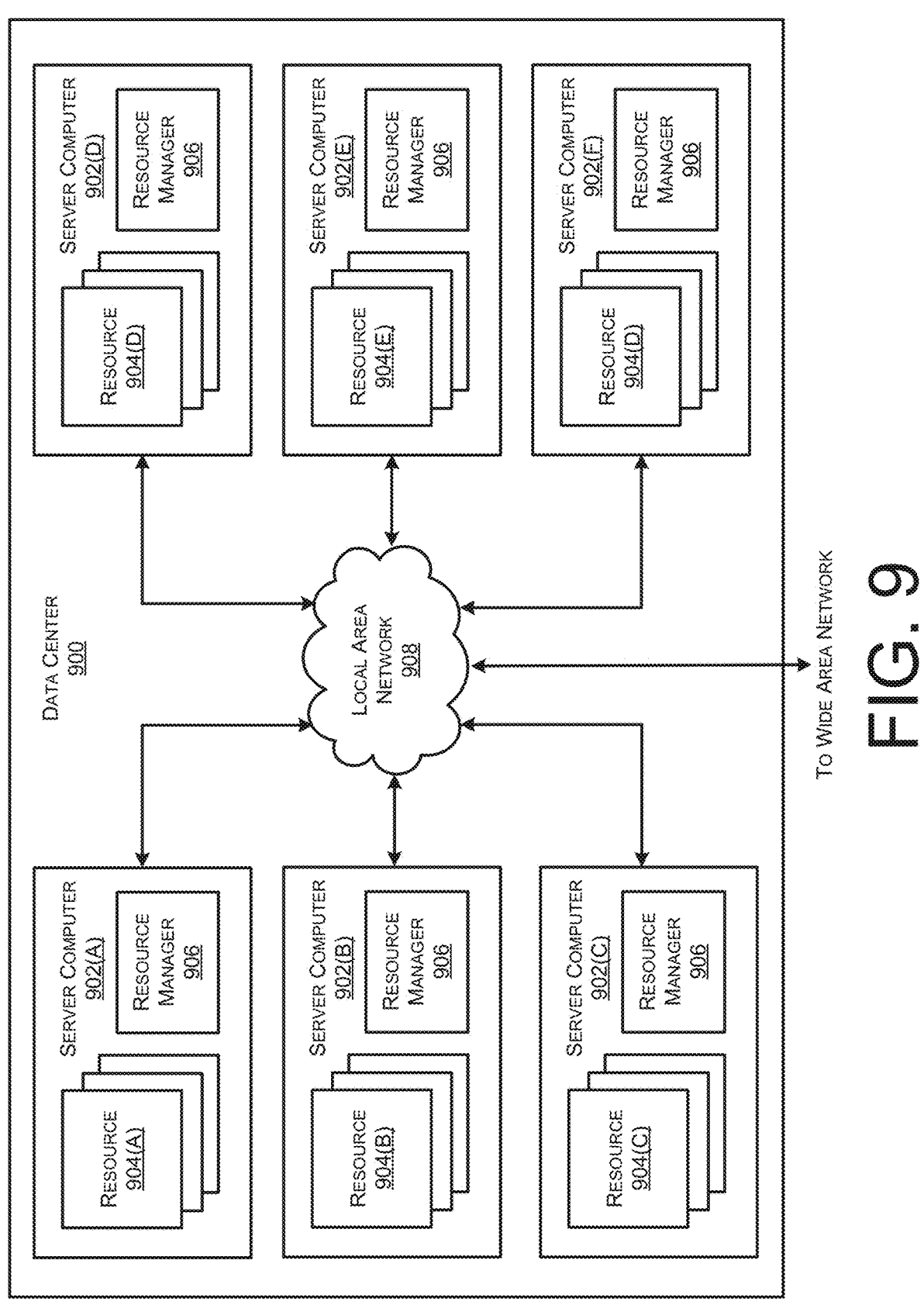
FIG. 9 illustrates a computing system diagram illustrating a configuration for a data center that can be utilized to implement aspects of the technologies disclosed herein.

FIG. 9 is a computing system diagram illustrating a configuration for a data center 900 that can be utilized to implement aspects of the technologies disclosed herein. The example data center 900 shown in FIG. 9 includes several computers 902A-902F (which might be referred to herein singularly as "a computer 902" or in the plural as "the computers 902") for providing computing resources. In some examples, the resources and/or computers 902 may include, or correspond to, the any type of networked device described herein. Although described as servers, the computers 902 may comprise any type of networked device, such as servers, switches, routers, hubs, bridges, gateways, modems, repeaters, access points, etc.

The computers 902 can be standard tower, rack-mount, or blade server computers configured appropriately for providing computing resources. In some examples, the computers 902 may provide computing resources 904 including data processing resources such as VM instances or hardware computing systems, database clusters, computing clusters, storage clusters, data storage resources, database resources, networking resources, and others. Some of the computers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single computer 902. The computers 902 in the data center 900 can also be configured to provide network services and other types of services.

In the example data center 900 shown in FIG. 9, an appropriate LAN 908 is also utilized to interconnect the computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 900, between each of the computers 902A-902F in each data center 900, and, potentially, between computing resources in each of the computers 902. It should be appreciated that the configuration of the data center 900 described with reference to FIG. 9 is merely illustrative and that other implementations can be utilized.

In some examples, the computers 902 may each execute one or more application containers and/or virtual machines to perform techniques described herein.

In some instances, the data center 900 may provide computing resources, like application containers, VM instances, and storage, on a permanent or an as-needed basis. Among other types of functionality, the computing resources provided by a cloud computing network may be utilized to implement the various services and techniques described above. The computing resources 904 provided by the cloud computing network can include various types of computing resources, such as data processing resources like application containers and VM instances, data storage resources, networking resources, data communication resources, network services, and the like.

Each type of computing resource 904 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 904 not mentioned specifically herein.

The computing resources 904 provided by a cloud computing network may be enabled in one embodiment by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 can also be located in geographically disparate locations. One illustrative embodiment for a data center 900 that can be utilized to implement the technologies disclosed herein will be described below with regard to FIG. 10.

Figure 10:
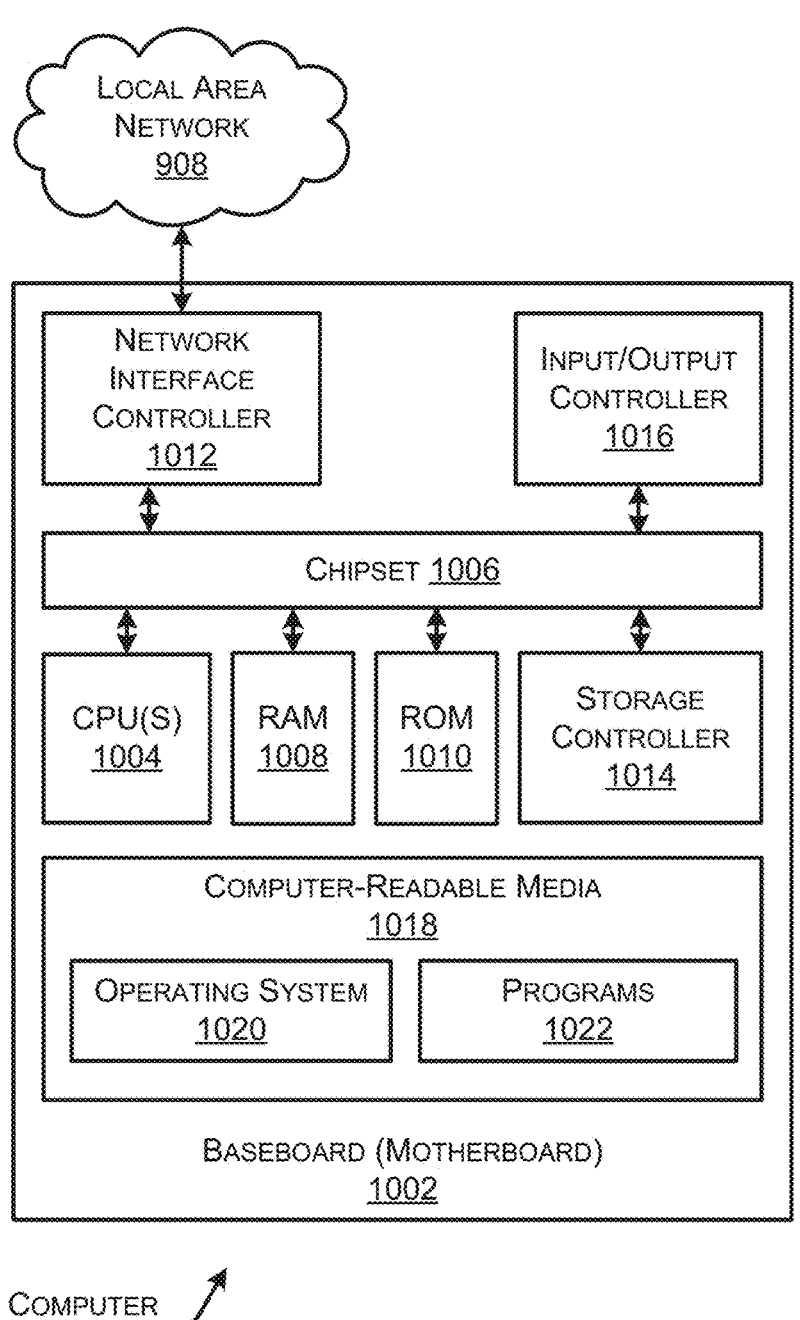
FIG. 10 is a computer architecture diagram showing an illustrative computer hardware architecture for implementing a computing device that can be utilized to implement aspects of the various technologies presented herein.

FIG. 10 shows an example computer architecture for a computer 902 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. The computer 902 may, in some examples, correspond a user device 106, access point 112 described herein, and may comprise networked devices such as servers, switches, routers, hubs, bridges, gateways, modems, repeaters, access points, etc.

The computer 902 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 902.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 902. The chipset 1006 can further provide an interface to a computer-readable storage medium such as a read-only memory ("ROM") 1010 or non-volatile RAM ("NVRAM") for storing basic routines that help to startup the computer 902 and to transfer information between the various components and devices. The ROM 1010 or NVRAM can also store other software components necessary for the operation of the computer 902 in accordance with the configurations described herein.

The computer 902 can operate in a networked environment using logical connections to remote computing devices and computer systems through a network, such as the network 908. The chipset 1006 can include functionality for providing network connectivity through a NIC 1012, such as a gigabit Ethernet adapter. The NIC 1012 is capable of connecting the computer 902 to other computing devices over the network 908. It should be appreciated that multiple NICs 1012 can be present in the computer 902, connecting the computer to other types of networks and remote computer systems.

The computer 902 can be connected to a storage device 1018 that provides non-volatile storage for the computer. The storage device 1018 can store an operating system 1020, programs 1022, and data, which have been described in greater detail herein. The storage device 1018 can be connected to the computer 902 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 902 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computer 902 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 902 can further read information from the storage device 1018 by detecting the physical states or characteristics of one or more particular locations within the physical storage units.

In addition to the mass storage device 1018 described above, the computer 902 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 902.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 902. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1018 can store other system or application programs and data utilized by the computer 902.

In one embodiment, the storage device 1018 or other computer-readable storage media is encoded with computer-executable instructions which, when loaded into the computer 902, transform the computer from a general-purpose computing system into a special-purpose computer capable of implementing the embodiments described herein. These computer-executable instructions transform the computer 902 by specifying how the CPUs 1004 transition between states, as described above. According to one embodiment, the computer 902 has access to computer-readable storage media storing computer-executable instructions which, when executed by the computer 902, perform the various processes described above with regard to FIGS. 1-6. The computer 902 can also include computer-readable storage media having instructions stored thereupon for performing any of the other computer-implemented operations described herein.

The computer 902 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 902 might not include all of the components shown in FIG. 10, can include other components that are not explicitly shown in FIG. 10, or might utilize an architecture completely different than that shown in FIG. 10.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by a source device, the method comprising:

establishing a connection between the source device and an access point using a communication protocol;

receiving, from the access point, a beacon message that includes a source device privacy capability indication to provide privacy for an IP address associated with the source device while communicating with the access point;

receiving a second beacon message associated with a second access point;

determining, based at least in part on the second beacon message, that the second access point does not include the source device privacy capability indication;

receiving, at the source device, user input including an instruction to enable source device privacy capability;

sending, from the source device to the access point, an instruction to enable the source device privacy capability during a communication session, wherein the communication session comprises a first communication session associated with a first application operating on the source device;

sending, from the source device to the access point, one or more IP packets that include data using the source device privacy capability;

determining a first privacy setting associated with the first application and determining to utilize the access point for the first communication session associated with the first application based at least in part on the first privacy setting; and determining a second privacy setting associated with a second application and determining to utilize the second access point for a second communication session associated with the second application based at least in part on the second privacy setting.

2. The method of claim 1, wherein the access point comprises an IEEE 802.11 capable Wi-Fi access point and the beacon message is i) received during a target beacon transit time; and ii) includes an SSID associated with the access point.

3. The method of claim 1, further comprising presenting, via a user interface of the source device, a first selectable option to utilize the first access point during the communication session and a second selectable option to access the second access point during the communication session.

4. The method of claim 1, further comprising:

receiving a first instruction to utilize the first access point for the first communication session associated with the first application; and receiving a second instruction to utilize the second access point for the second communication session associated with the second application.

5. The method of claim 1, further comprising:

determining that the beacon message indicates that the access point is capable of operating in a first setting in which source device privacy capabilities are enabled and operating in a second setting in which source device privacy capabilities are disabled; and presenting, via a user interface of the source device, a first selectable option to communicate via the first setting and a second selectable option to communicate via the second setting.

6. The method of claim 1, wherein the instruction to enable the source device privacy capability during the communication session comprises at least one of a bit or a flag included in an association request for joining a basic service set (BSS).

7. The method of claim 1, wherein the instruction to enable the source device privacy capability during the communication session is performed during at least one of 802.1x or EAP authentication procedures.

8. The method of claim 1, further comprising determining that the access point provides IP address privacy in response to an Access Network Query Protocol (ANQP) query using a Generic Advertising Service (GAS) request frame.

9. A system comprising:

one or more processors; and one or more computer-readable media storing computer-executable instructions that, when executed by the one or more processors, cause the one or more processors to perform operations comprising:

establishing a connection between a source device and an access point using a communication protocol;

receiving, from the access point, a beacon message that includes a source device privacy capability indication to provide privacy for an IP address associated with the source device while communicating with the access point;

receiving a second beacon message associated with a second access point;

determining, based at least in part on the second beacon message, that the second access point does not include the source device privacy capability indication;

receiving user input including an instruction to enable source device privacy capability;

sending, to the access point, an instruction to enable the source device privacy capability during a communication session, wherein the communication session comprises a first communication session associated with a first application operating on the source device;

sending, to the access point, one or more IP packets that include data using the source device privacy capability;

determining a first privacy setting associated with the first application and determining to utilize the access point for the first communication session associated with the first application based at least in part on the first privacy setting; and determining a second privacy setting associated with a second application and determining to utilize the second access point for a second communication session associated with the second application based at least in part on the second privacy setting.

10. The system of claim 9, wherein the access point comprises an IEEE 802.11 capable Wi-Fi access point and the beacon message is i) received during a target beacon transit time; and ii) includes an SSID associated with the access point.

11. The system of claim 9, wherein the operations further comprise presenting, via a user interface of the source device, a first selectable option to utilize the access point during the communication session and a second selectable option to access the second access point during the communication session.

12. The system of claim 9, wherein the operations further comprise:

receiving a first instruction to utilize the access point for the first communication session associated with the first application; and receiving a second instruction to utilize the second access point for the second communication session associated with the second application.

13. The system of claim 9, wherein the operations further comprise:

determining that the beacon message indicates that the access point is capable of operating in a first setting in which source device privacy capabilities are enabled and operating in a second setting in which source device privacy capabilities are disabled; and presenting, via a user interface of the source device, a first selectable option to communicate via the first setting and a second selectable option to communicate via the second setting.

14. The system of claim 9, wherein the instruction to enable the source device privacy capability during the communication session comprises at least one of a bit or a flag included in an association request for joining a basic service set (BSS).

15. The system of claim 9, wherein the instruction to enable the source device privacy capability during the communication session is performed during at least one of 802.1x or EAP authentication procedures.

16. A device comprising:

one or more processors; and one or more computer-readable media storing computer-executable instructions that, when executed by the one or more processors, cause the one or more processors to perform operations comprising:

establishing a connection between the device and an access point using a communication protocol;

receiving, from the access point, a beacon message that includes a device privacy capability indication to provide privacy for an IP address associated with the device while communicating with the access point;

receiving a second beacon message associated with a second access point;

determining, based at least in part on the second beacon message, that the second access point does not include the device privacy capability indication;

receiving user input including an instruction to enable device privacy capability;

sending, to the access point, an instruction to enable the device privacy capability during a communication session, wherein the communication session comprises a first communication session associated with a first application operating on the device;

sending, to the access point, one or more IP packets that include data using the device privacy capability;

determining a first privacy setting associated with the first application and determining to utilize the access point for the first communication session associated with the first application based at least in part on the first privacy setting; and determining a second privacy setting associated with a second application and determining to utilize the second access point for a second communication session associated with the second application based at least in part on the second privacy setting.

17. The device of claim 16, wherein the access point comprises an IEEE 802.11 capable Wi-Fi access point and the beacon message is i) received during a target beacon transit time; and ii) includes an SSID associated with the access point.

18. The device of claim 16, wherein the operations further comprise presenting, via a user interface of the device, a first selectable option to utilize the access point during the communication session and a second selectable option to access the second access point during the communication session.

19. The device of claim 16, wherein the operations further comprise:

receiving a first instruction to utilize the access point for the first communication session associated with the first application; and receiving a second instruction to utilize the second access point for the second communication session associated with the second application.

20. The device of claim 16, wherein the operations further comprise:

determining that the beacon message indicates that the access point is capable of operating in a first setting in which device privacy capabilities are enabled and operating in a second setting in which device privacy capabilities are disabled; and presenting, via a user interface of the device, a first selectable option to communicate via the first setting and a second selectable option to communicate via the second setting.

* * * * *